(12) United States Patent
Shinohara

(10) Patent No.: US 8,749,896 B2
(45) Date of Patent: Jun. 10, 2014

(54) IMAGING LENS AND IMAGING APPARATUS PROVIDED WITH THE IMAGING LENS

(71) Applicant: FUJIFILM Corporation, Tokyo (JP)

(72) Inventor: Yoshikazu Shinohara, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 14/073,269

(22) Filed: Nov. 6, 2013

(65) Prior Publication Data

US 2014/0071543 A1 Mar. 13, 2014

Related U.S. Application Data

(63) Continuation of application No. PCT/JP2013/001107, filed on Feb. 26, 2013.

(60) Provisional application No. 61/637,600, filed on Apr. 24, 2012.

(30) Foreign Application Priority Data

Mar. 26, 2012 (JP) ................................. 2012-068605

(51) Int. Cl.
*G02B 13/00* (2006.01)
*G02B 13/18* (2006.01)
(52) U.S. Cl.
CPC ............ *G02B 13/0045* (2013.01); *G02B 13/18* (2013.01)
USPC .......................................... 359/713; 359/756

(58) Field of Classification Search
CPC ............................ G02B 13/0045; G02B 13/18
USPC .......................................... 359/713, 756, 757
See application file for complete search history.

(56) References Cited

U.S. PATENT DOCUMENTS

| 8,385,006 B2 | 2/2013 | Tsai et al. |
| 2012/0243108 A1 | 9/2012 | Tsai et al. |
| 2013/0120858 A1 | 5/2013 | Sano |

FOREIGN PATENT DOCUMENTS

| CN | 202067015 | 12/2011 |
| JP | 01-142518 | 6/1989 |
| JP | 10-123418 | 5/1998 |
| KR | 10-2010-0040357 | 4/2010 |
| KR | 10-2011-0024872 | 3/2011 |
| WO | WO 2012/008357 | 1/2012 |

OTHER PUBLICATIONS

International Search Report, PCT/JP2013/001107, Jul. 9, 2013.

*Primary Examiner* — David N Spector
(74) *Attorney, Agent, or Firm* — Young & Thompson

(57) ABSTRACT

An imaging lens substantially consisting of six lenses, composed of a first lens having a positive refractive power and a convex surface on the object side, a second lens having a negative refractive power and a concave surface on the image side, a third lens having a positive refractive power and a convex surface on the object side, a fourth lens having a positive refractive power, a fifth lens having a negative refractive power and a concave surface on the image side, and a sixth lens having a negative refractive power with the image side surface having an aspherical shape which is concave on the image side near the optical axis and convex in a peripheral region.

17 Claims, 25 Drawing Sheets

EXAMPLE 2

EXAMPLE 5

EXAMPLE 6

EXAMPLE 7

EXAMPLE 8

EXAMPLE 12

EXAMPLE 3

EXAMPLE 4

EXAMPLE 11

EXAMPLE 12

IMAGING LENS AND IMAGING APPARATUS PROVIDED WITH THE IMAGING LENS

CROSS REFERENCE TO RELATED APPLICATIONS

This application is a continuation of PCT/JP2013/001107 filed on Feb. 26, 2013, which claims foreign priority to Japanese Application No. 2012-068605 filed on Mar. 26, 2012. This application also claims the 35 USC 119(e) benefit of provisional application 61/637,600 filed on Apr. 24, 2012. The entire contents of each of the above applications are hereby incorporated by reference.

BACKGROUND OF THE INVENTION

1. Field of the Invention

The present invention relates to a fixed focus imaging lens for forming an optical image of a subject on an image sensor, such as a CCD (Charge Coupled Device), CMOS (Complementary Metal Oxide Semiconductor), or the like, and an imaging apparatus provided with the imaging lens to perform imaging, such as a digital still camera, camera-equipped cell phone, personal digital assistance (PDA), smartphone, portable video game player, or the like.

2. Description of the Related Art

Recently, along with the spread of personal computers to homes and the like, digital still cameras capable of inputting image information obtained by imaging a landscape, a person, or the like to a personal computer have been spreading rapidly. In addition, more and more cell phones and smartphoes have built-in camera modules for inputting images. Such devices with imaging capabilities employ image sensors such as CCDs, CMOSs, and the like. Recently, these types of image sensors have been downsized greatly and, consequently, imaging devices as a whole and imaging lenses mounted on such devices have also been demanded to have more compact sizes. At the same time, the pixel count of image sensors has been increasing, thereby causing a growing demand for improvement of imaging lenses in resolution and performance. For example, performance corresponding to high pixel counts, such as more than 5 Mega Pixels, and more preferably more than 8 Mega Pixels is demanded.

For responding to such demands, it is conceivable to employ a relatively large number of lenses, such as a five- or six-lens configuration, in order to achieve, for example, reduction in overall length and improvement in resolution (refer to Korean Unexamined Patent Publication No. 2010-0040357 and Chinese Utility Model Publication No. 202067015 (U.S. Pat. No. 8,385,006)).

SUMMARY OF THE INVENTION

In imaging lenses required of reduction in overall length, such as those having a relatively large number of lenses as described above and used, in particular, for personal digital assistance devices, realization of an imaging lens having a large image size and applicable to an image sensor having a large size comparable to that of conventional image sensors is demanded.

In order to respond to these demands, the imaging lens formed of six lenses described in Patent Document 1 requires further reduction in overall length. The imaging lens described in Patent Document 2 has a large ratio of overall length relative to the size of image sensor, and when applied to an image sensor having a relatively large size by extending proportionally, the overall length becomes long, so that the overall length needs to be further reduced after all.

The present invention has been developed in view of the circumstances described above and it is an object of the present invention to provide an imaging lens having a large image size and capable of realizing high image quality from the central angle of view to peripheral angle of view with reduced overall length. It is a further object of the present invention to provide an imaging apparatus provided with the imaging lens and capable of obtaining a high resolution image.

An imaging lens of the present invention substantially consists of six lenses, composed of:

a first lens having a positive refractive power and a convex surface on the object side;

a second lens having a negative refractive power and a concave surface on the image side;

a third lens having a positive refractive power and a convex surface on the object side;

a fourth lens having a positive refractive power;

a fifth lens having a negative refractive power and a concave surface on the image side; and a sixth lens having a negative refractive power with the image side surface having an aspherical shape which is concave on the image side near the optical axis and convex in a peripheral region, arranged in this order from the object side.

According to the imaging lens of the present invention, the structure of each lens element is optimized and, in particular, the first to third, fifth, and sixth lenses are formed in appropriate shapes in a lens configuration of six lenses in total. This allows realization of a lens system having high resolution performance, while the overall length is reduced.

The term "substantially consists of six lenses" as used herein refers to that the imaging lens of the present invention includes a lens substantially without any refractive power, an optical element other than a lens, such as an aperture stop, cover glass, or the like, a lens flange, a lens barrel, an image sensor, and a mechanism, such as a camera-shake correction mechanism or the like, other than the six lenses.

In the imaging lens of the present invention, further adoption and satisfaction of the following preferable configurations may further improve the optical performance.

In the imaging lens of the present invention, the third lens is preferably a bi-convex lens.

In the imaging lens of the present invention, an aperture stop is preferably disposed on the object side of the object side surface of the second lens and more preferably on the object side of the object side surface of the first lens.

Further, in the imaging lens of the present invention, the image side surface of the fifth lens has an aspherical shape which is concave on the image side near the optical axis and convex in a peripheral region.

Preferably, the imaging lens of the present invention satisfies any one or any combination of the conditional expressions (1) to (4-2) given below:

$$vd5 < 35 \tag{1}$$

$$vd5 < 33 \tag{1-1}$$

$$vd5 < 31 \tag{1-2}$$

$$vd2 < 35 \tag{2}$$

$$0.9 < f3/f1 \tag{3}$$

$$1.0 < f3/f1 < 10 \tag{3-1}$$

$$1.0 < f3/f1 < 8 \quad (3\text{-}2);$$

$$1.0 < f3/f1 < 5 \quad (3\text{-}3);$$

$$0.4 < f6/f2 < 1.3 \quad (4);$$

$$0.5 < f6/f2 < 1.2 \quad (4\text{-}1); \text{ and}$$

$$0.55 < f6/f2 < 1.1 \quad (4\text{-}2),$$

where:
 f1 is a focal length of the first lens;
 f2 is a focal length of the second lens;
 f3 is a focal length of the third lens;
 f6 is a focal length of the sixth lens;
 vd2 is an Abbe number of the second lens with respect to the d-line; and
 vd5 is an Abbe number of the fifth lens with respect to the d-line.

The imaging apparatus of the present invention is provided with the imaging lens of the present invention.

The imaging apparatus of the present invention may obtain a high resolution image signal based on a high resolution optical image obtained by the imaging lens of the present invention.

According to the imaging lens of the present invention, the structure of each lens element is optimized, in particular, the first and sixth lens are formed in appropriate shapes in a lens configuration of six lenses in total. This allows realization of a lens system having a large image size and high image quality from the central angle of view to peripheral angle of view, while the overall length is reduced.

According to the imaging apparatus of the present invention, an image signal is outputted according to an optical image formed by the imaging lens of the present invention having high image quality described above, so that a high resolution image may be obtained based on the image signal.

DESCRIPTION OF THE PREFERRED EMBODIMENTS

Hereinafter, embodiments of the present invention will be described in detail with reference to the accompanying drawings.

Figure 1:
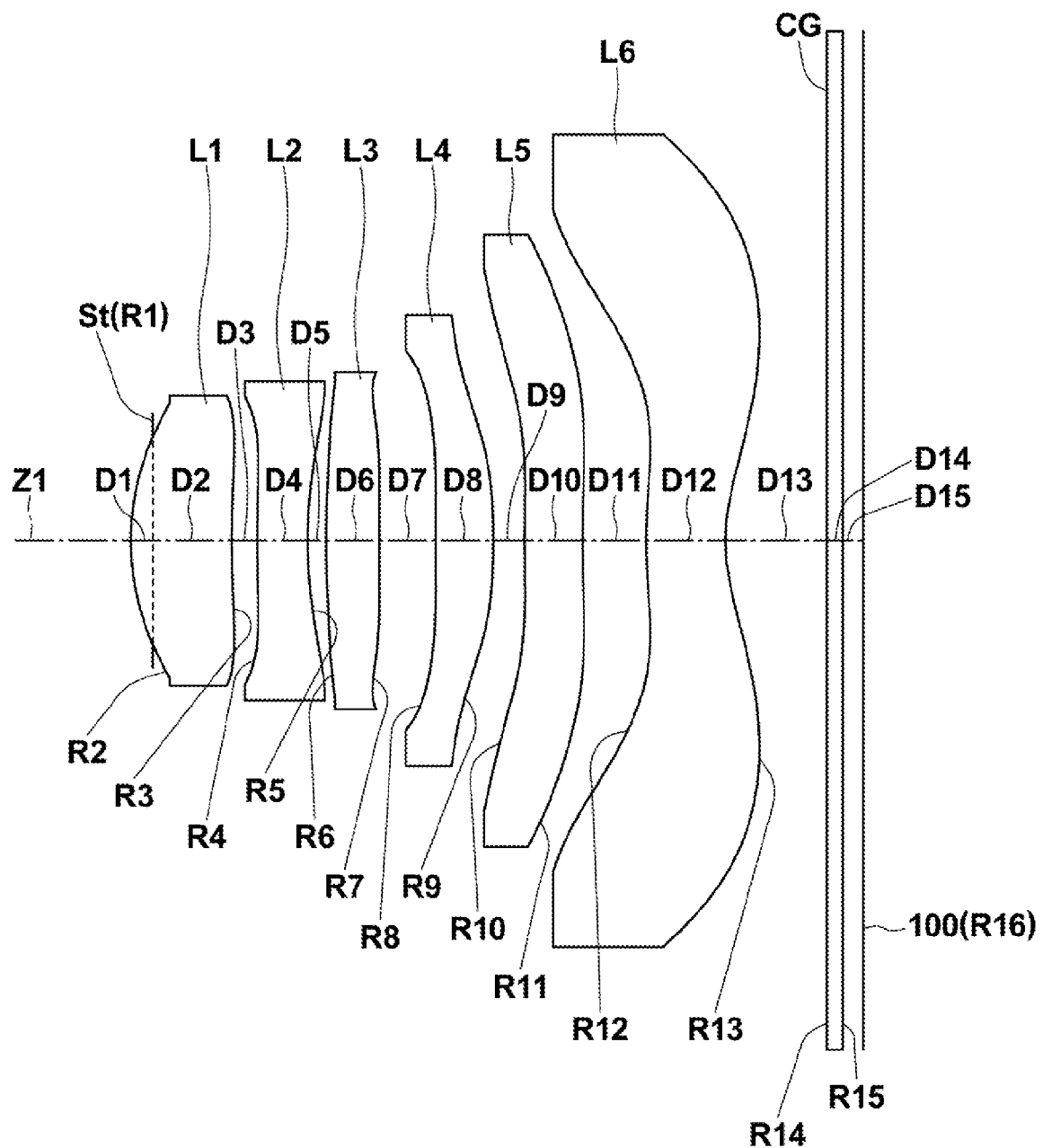
FIG. 1 illustrates a first configuration example of the imaging lens according to an embodiment of the present invention, which is a cross-sectional view of a lens corresponding to Example 1.

FIG. 1 illustrates a first configuration example of the imaging lens according to an embodiment of the present invention. This configuration example corresponds to the lens configuration of a first numerical example (Table 1, Table 13) to be described later. Likewise, the second to twelfth configuration examples corresponding to the lens configurations of the second to twelfth numerical examples (Tables 2 to 12 and Tables 14 to 24) to be described later are illustrated in FIGS. 2 to 12 respectively. In FIGS. 1 to 12, the symbol Ri represents a radius of curvature of $i^{th}$ surface, in which a number i is allocated to each surface in a sequentially increasing manner toward the image side (image formation side) with the object side surface of the most object side lens being taken as the first surface. The symbol Di represents a surface separation between $i^{th}$ surface and $(i+1)^{th}$ surface on the optical axis Z1. As the basic configuration is identical in each configuration example, hereinafter, the description will be made based on the configuration example illustrated in FIG. 1, and configuration examples of FIGS. 2 to 12 will be described as required.

An imaging lens L according to the present embodiment is suitably applied to various types of imaging devices that use an image sensor, such as a CCD or CMOS. It is particularly useful for relatively small portable terminal devices, such as digital still cameras, camera-equipped cell phones, smartphones, PDAs, and the like. The imaging lens L has a first lens L1, a second lens L2, a third lens L3, a fourth lens L4, a fifth lens L5, and a sixth lens L6, arranged in this order from the object side along the optical axis Z1.

Figure 25:
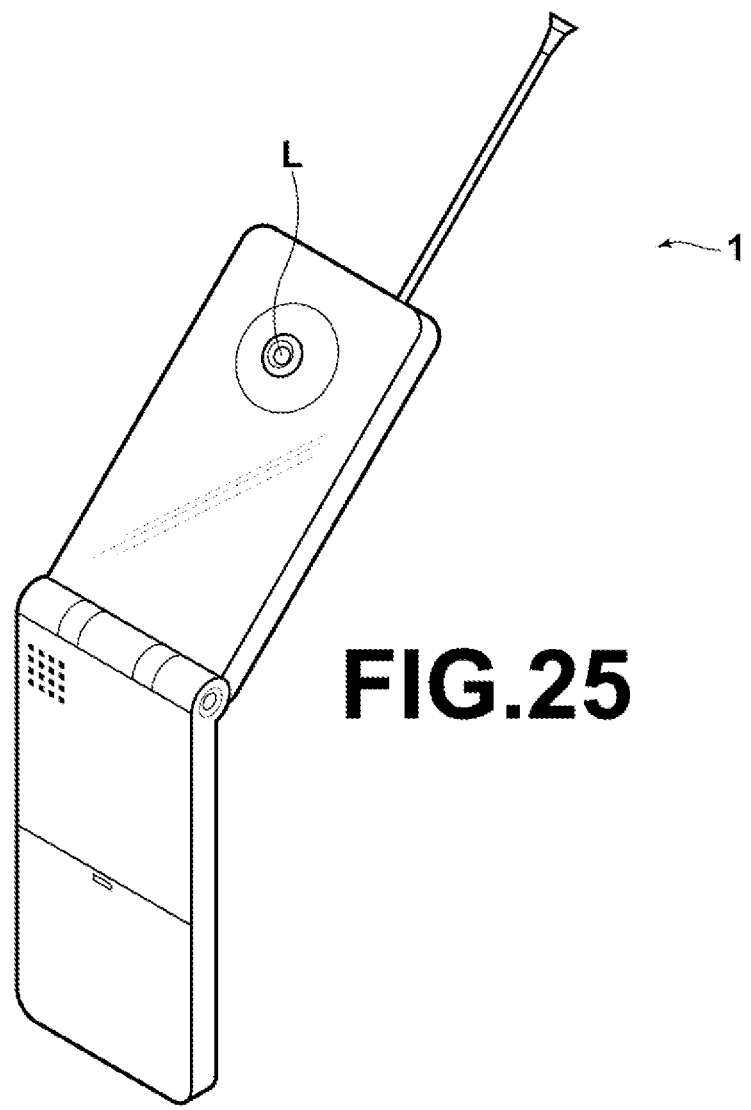
FIG. 25 illustrates an imaging apparatus which is a cell phone terminal provided with the imaging lens of the present invention.

FIG. 25 illustrates an overview of a cell phone terminal which is an imaging apparatus 1 according to the present embodiment. The imaging apparatus 1 according to the present embodiment includes the imaging lens L according to the present embodiment and an image sensor 100 (FIG. 1) such as a CCD that outputs an image signal according to an optical image formed by the imaging lens L. The image sensor 100 is disposed on the imaging plane (image plane R16) of the imaging lens L.

Figure 26:
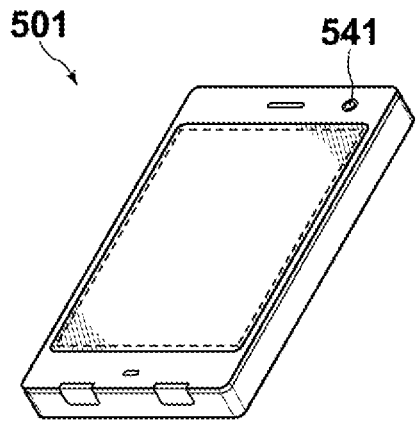
FIG. 26 illustrates an imaging apparatus which is a smartphone terminal provided with the imaging lens of the present invention.

FIG. 26 illustrates an overview of a smartphone which is an imaging apparatus 501 according to an embodiment of the present invention. The imaging apparatus 501 includes a camera section 541 having the imaging lens L according to the present embodiment and an image sensor 100 (FIG. 1), such as a CCD, that outputs image signal according to an optical image formed by the imaging lens L. The image sensor 100 is disposed on the imaging plane (image plane) of the imaging lens L.

Various types of optical members CG may be disposed between the sixth lens L6 and image sensor 100 according to the structure on the camera side to which the lens is mounted. For example, a plate-like optical member, such as a cover glass for protecting the imaging surface or an infrared cut filter may be disposed. In this case, for example, a plate-like cover glass with a coating applied thereon having a filtering effect, such as an infrared cut filter or ND filter, may be used as the optical member CG.

Further, the optical member CG may be omitted and the sixth lens L6 may be provided with a coating to have an effect identical to that of the CG. This may contribute to the reduction in the number of components used and reduction in overall length.

Preferably, the imaging lens L also has an aperture stop St disposed on the object side of the object side surface of the second lens L2. Arrangement of the aperture stop St on the object side of the object side surface of the second lens L2 in the manner described above allows incident angles of the light rays passing through the optical system, in particular, in a peripheral region of the imaging area, on the imaging plane (image sensor) to be prevented from increasing. It is further preferable that the aperture stop St is disposed on the object side of the object side surface of the first lens in order to enhance this effect.

The term that the aperture stop St "is disposed on the object side of the object side surface of the second lens" as used herein refers to that the aperture stop is disposed, in an optical axis direction, at a position corresponding to the intersection point between the axial marginal ray and object side surface of the second lens L2 or on the object side of the intersection point, and the term that the aperture stop St "is disposed on the object side of the object side surface of the first lens" as used herein refers to that the aperture stop is disposed, in an optical axis direction, at a position corresponding to the intersection point between the axial marginal ray and object side surface of the first lens L1 or on the object side of the intersection point. In the present embodiment, lenses of the first to twelfth configuration examples (FIGS. 1 to 12) are configuration examples in which the aperture stop St is disposed on the object side of the object side lens of the first lens L1. Although the aperture stop St is disposed on the image side of the surface apex of the first lens L1, but the aperture stop St may be disposed on the object side of the surface apex of the first lens L1. The arrangement of the aperture stop St on the object side of the surface apex of the first lens L1 is somewhat disadvantageous from the viewpoint of ensuring peripheral light intensity in comparison with the arrangement of the aperture stop St on the image side of the surface apex of the first lens L1, but allows appropriate prevention of increase in incident angle of light rays passing through a peripheral region of the imaging area of the optical system on the imaging plane (image sensor).

In the imaging lens L, the first lens L1 has a positive refractive power near the optical axis. The first lens L1 has a convex surface on the object side near the optical axis. In this way, by forming the first lens L1 to have a convex surface on the object side near the optical axis, the most object side surface of the lens system has a convex shape on the object side. This allows the rear principal point to be positioned more object side and the overall length may be reduced appropriately.

The second lens L2 has a negative refractive power near the optical axis. The second lens L2 has a concave surface on the image side near the optical axis. By forming the second lens L2 to have a concave surface on the image side near the optical axis, generation of field curvature may be suppressed while reducing longitudinal chromatic aberration.

The third lens L3 has a positive refractive power near the optical axis. The third lens has a convex surface on the object side near the optical axis. By forming the third lens L3 to have a convex shape on the object side near the optical axis, the third lens L3 has a corresponding shape to that of the second lens L2 having a concave shape on the image side. This allows the distance between the second lens L2 and the third lens L3 on the optical axis to be reduced, whereby the overall length may be further reduced. Preferably, the third lens L3 is formed to have a bi-convex shape near the optical axis. By forming the image side surface of the third lens L3 to have a convex shape on the image side, the refractive powers of the first lens L1 to third lens L3 may be increased, while suppressing influences on the aberrations of light rays passing through a peripheral region of the optical system, whereby reduction in overall length may be realized more satisfactorily.

The fourth lens L4 has a positive refractive power near the optical axis.

The fifth lens L5 has a negative refractive power near the optical axis. The fifth lens L5 has a concave surface on the image side near the optical axis. In the imaging lens L, by forming the fifth lens L5 to have a concave surface on the image side near the optical axis, reduction in overall length may be realized satisfactorily. Further, the image side surface of the fifth lens L5 has preferably an aspherical shape which is concave on the image side near the optical axis and convex in a peripheral region. By forming the fifth lens L5 to have a convex shape in a peripheral region, incident angles of the light rays passing through the optical system, in particular, in a peripheral region of the imaging area, on the imaging plane (image sensor) may be prevented from increasing. Thus, degradation of light receiving efficiency may be prevented while realizing reduction in overall length. The term "peripheral region" as used herein refers to a region beyond about 60% of the maximum effective radius in a radial direction.

The sixth lens L6 has a negative refractive power near the optical axis. The sixth lens L6 has a concave surface on the image side near the optical axis. In the imaging lens L, by forming the sixth lens L6 to have a concave surface on the image side near the optical axis, the overall length may be reduced satisfactorily. Further, the image side surface of the sixth lens L6 has an aspherical shape which is concave on the image side near the optical axis and convex in a peripheral region. By forming the sixth lens L6 such that the image side surface has an aspherical shape which is concave near the optical axis and convex in the peripheral region, incident angles of the light rays passing through the optical system, in particular, in a peripheral region of the imaging area, on the imaging plane (image sensor) may be prevented from increasing. Thus, degradation in light receiving efficiency in a peripheral region of the imaging area may be prevented while realizing reduction in overall length. The term "peripheral region" as used herein refers to a region beyond about 60% of the maximum effective radius in a radial direction.

The positive first lens L1, negative second lens L2, and positive third lens L3 of the imaging lens L constitute the main refractive power of the entire lens system. The configuration of the first lens L1 to third lens L3 allows realization of appropriate overall length reduction with respect to pixel size and a large image size. Further, according to the configuration of the first lens L1 to third lens L3, longitudinal chromatic aberration and spherical aberration may be corrected satisfactorily. Further, in the imaging lens L, provision of the fourth lens L4 to increase the refractive power and provision of fifth lens L5 and L6 having negative refractive powers adjacent to the image side of the fourth lens L4 allows the rear principal point of the entire lens system to be located further on the object side and the overall length may be reduced satisfactorily.

Preferably, the imaging lens L uses an aspherical surface on at least one surface of each of the first lens L1 to sixth lens L6 for performance improvement.

Each of the lenses L1 to L6 constituting the imaging lens L is preferably not a cemented lens but a single lens. This provides more aspherical surfaces in comparison with the case in which any of the lenses L1 to L6 is a cemented lens, resulting in higher design flexibility and the overall length may be reduced satisfactorily.

The function and advantageous effects of the imaging lens L configured in the manner described above with respect to conditional expressions will now be described in detail.

First, the Abbe number vd5 of the fifth lens L5 with respect to the d-line preferably satisfies a conditional expression (1) given below.

$$vd5<35 \qquad (1)$$

The conditional expression (1) defines a preferable value range of the Abbe number of the fifth lens L5 with respect to the d-line. If the fifth lens L5 exceeds the upper limit of the conditional expression (1), longitudinal chromatic aberration is likely to become under-correction while lateral chromatic aberration in the peripheral region of the imaging area is likely to become over-correction, so that satisfactory correction becomes difficult. By satisfying the conditional expression (1) and forming the fifth lens L5 with a high dispersion material, longitudinal chromatic aberration and lateral chromatic aberration in the peripheral region of the imaging area may be corrected satisfactorily. From this point of view, it is more preferable that a conditional expression (1-1) given below is satisfied and further preferable that a conditional expression (1-2) given below is satisfied.

$$vd5<33 \qquad (1\text{-}1)$$

$$vd5<31 \qquad (1\text{-}2)$$

The Abbe number vd2 of the second lens L2 with respect to the d-line satisfies the conditional expression (2) given below.

$$vd2<35 \qquad (2)$$

The conditional expression (2) defines a preferable value range of the Abbe number of the second lens L2 with respect to the d-line. If the second lens L2 exceeds the upper limit of the conditional expression (2), satisfactory correction of longitudinal chromatic aberration becomes difficult. Consequently, by satisfying the conditional expression (2) and forming the second lens L2 with a high dispersion material, longitudinal chromatic aberration may be corrected satisfactorily.

The ratio of the focal length f3 of the third lens L3 to the focal length f1 of the first lens L1 satisfies a conditional expression (3) given below.

$$0.9 < f3/f1 \quad (3)$$

The conditional expression (3) defines a preferable value range of the ratio of the focal length f3 of the third lens L3 to the focal length f1 of the first lens L1. If the ratio falls below the lower limit of the conditional expression (3), the positive refractive power of the first lens L1 becomes too weak relative to the positive refractive power of the third lens L3 and reduction in overall length becomes difficult. Consequently, by satisfying the range of the conditional expression (3), the length of the entire lens system may be reduced satisfactorily. More preferably, the ratio of focal length f3 of the third lens L3 to focal length f1 of the first lens L1 satisfies a conditional expression (3-1) given below. If the ratio exceeds the upper limit of the conditional expression (3-1), correction of field curvature becomes difficult. Consequently, by satisfying the range of the conditional expression (3-1), various types of aberrations may be corrected satisfactorily. Further, by satisfying the lower limit of the conditional expression (3-1), the length of the entire lens system may be reduced more satisfactorily. In order to further enhance the advantageous effect, it is more preferable that the ratio satisfies a conditional expression (3-2) and further preferable that the ratio satisfies a conditional expression (3-3).

$$1.0 < f3/f1 < 10 \quad (3\text{-}1)$$

$$1.0 < f3/f1 < 8 \quad (3\text{-}2)$$

$$1.0 < f3/f1 < 5 \quad (3\text{-}3)$$

The ratio of the focal length f6 of the sixth lens L6 to the focal length f2 of the second lens L2 satisfies a conditional expression (4) given below.

$$0.4 < f6/f2 < 1.3 \quad (4)$$

The conditional expression (4) defines a preferable value range of the ratio of the focal length f6 of the sixth lens L6 to the focal length f2 of the second lens L2. If the ratio falls below the lower limit of the conditional expression (4), the refractive power of the sixth lens L6 becomes too strong with respect to that of the second lens L2, so that field curvature is likely to be over-corrected and it is difficult to obtain favorable imaging performance. If the ratio exceeds the upper limit of the conditional expression (4), the refractive power of the sixth lens L6 becomes too weak with respect to that of the second lens L2, so that field curvature is likely to be under-corrected and it is difficult to obtain favorable imaging performance. Consequently, by satisfying the range of the conditional expression (4), field curvature may be corrected satisfactorily. In order to further enhance the advantageous effect, it is more preferable that the ratio satisfies a conditional expression (4-1) and further preferable that the ratio satisfies a conditional expression (4-2).

$$0.5 < f6/f2 < 1.2 \quad (4\text{-}1)$$

$$0.55 < f6/f2 < 1.1 \quad (4\text{-}2)$$

As described above, according to the imaging lens L of an embodiment of the present invention, the structure of each lens element is optimized, in particular, the first lens L1 and sixth lens L6 are formed in appropriate shapes in a lens configuration of six lenses in total. This allows realization of a lens system having a large image size and high resolution performance, while the overall length is reduced.

Further, high image quality may be realized by satisfying preferable conditions, as appropriate. Still further, according to the imaging apparatus of the present embodiment, an image signal is outputted according to an optical image formed by the high performance imaging lens L of the present embodiment, so that a high resolution image may be obtained from the central angle of view to peripheral angle of view.

Next, specific numerical examples of the imaging lens according to the present embodiment will be described. Hereinafter, a plurality of numerical examples will be described collectively.

Tables 1 and 13, to be shown later, show specific lens data corresponding to the configuration of the imaging lens illustrated in FIG. 1, in which Table 1 mainly shows basic lens data while Table 13 shows aspherical surface data. The column of surface number Si in the lens data shown in Table 1 represents the number of $i^{th}$ surface of Example 1, in which a number i is allocated to each surface in a sequentially increasing manner toward the image side with the object side surface of the most object side lens being taken as the first surface (the aperture stop St being taken as the $1^{st}$ surface). The column of radius of curvature Ri represents the value of radius of curvature (mm) of $i^{th}$ surface from the object side, the symbol Ri being corresponding to the symbol Ri in FIG. 1. Likewise, the column of surface separation Di represents the distance between $i^{th}$ surface Si and $(i+1)^{th}$ surface Si+1 on the optical axis (mm). The column of Ndj represents the value of refractive index of $j^{th}$ optical element from the object side with respect to the d-line (587.56 nm). The column of vdj indicates the value of Abbe number of $j^{th}$ optical element with respect to the d-line. Further, Table 1 shows the focal length f of the entire system (mm), back focus Bf (mm), F-number Fno., total angle of view 2ω(°), and overall lens length TL (mm), as miscellaneous data. Note that each table shows an air equivalent value as the back focus Bf and is used for the portion of the back focus Bf in the overall lens length TL.

In the imaging lens according to Example 1, both surfaces of each of the first lens L1 to sixth lens L6 have aspherical shapes. In the basic lens data in Table 1, values of radii of curvature near the optical axis (paraxial radii of curvature) are shown as the radii of curvature of these aspherical surfaces.

Table 13 indicates aspherical surface data of imaging lens of Example 1. In the values indicated as the aspherical surface data, the symbol "E" represents that the subsequent value is a base-10 "exponent" and the numerical value preceding the symbol "E" is multiplied by the numerical value represented by the base-10 exponent function. For example, "1.0E-02" is "$1.0 \times 10^{-2}$".

As for the aspherical surface data, a value of each of coefficients Ai and K in the aspherical surface expression represented by the formula A given below is indicated. More specifically, Z is a length of a perpendicular line drawn from a point on the aspherical surface at a height h from the optical axis to a tangent plane to the apex of the aspherical surface (plane orthogonal to the optical axis) (mm).

$$Z = C \cdot h^2 / \{1 + (1 - K \cdot C^2 \cdot h^2)^{1/2}\} + \Sigma Ai \cdot h^i \quad \text{A}$$

where:

Z is the depth of an aspherical surface;

h is a distance (height) from the optical axis to the lens surface (mm);

C is a paraxial curvature (=1/R);

R is a paraxial radius of curvature;

$A_i$ is an $i^{th}$ order (i is an integer greater than or equal to 3) aspherical surface coefficient; and K is an aspherical surface coefficient.

Figure 2:
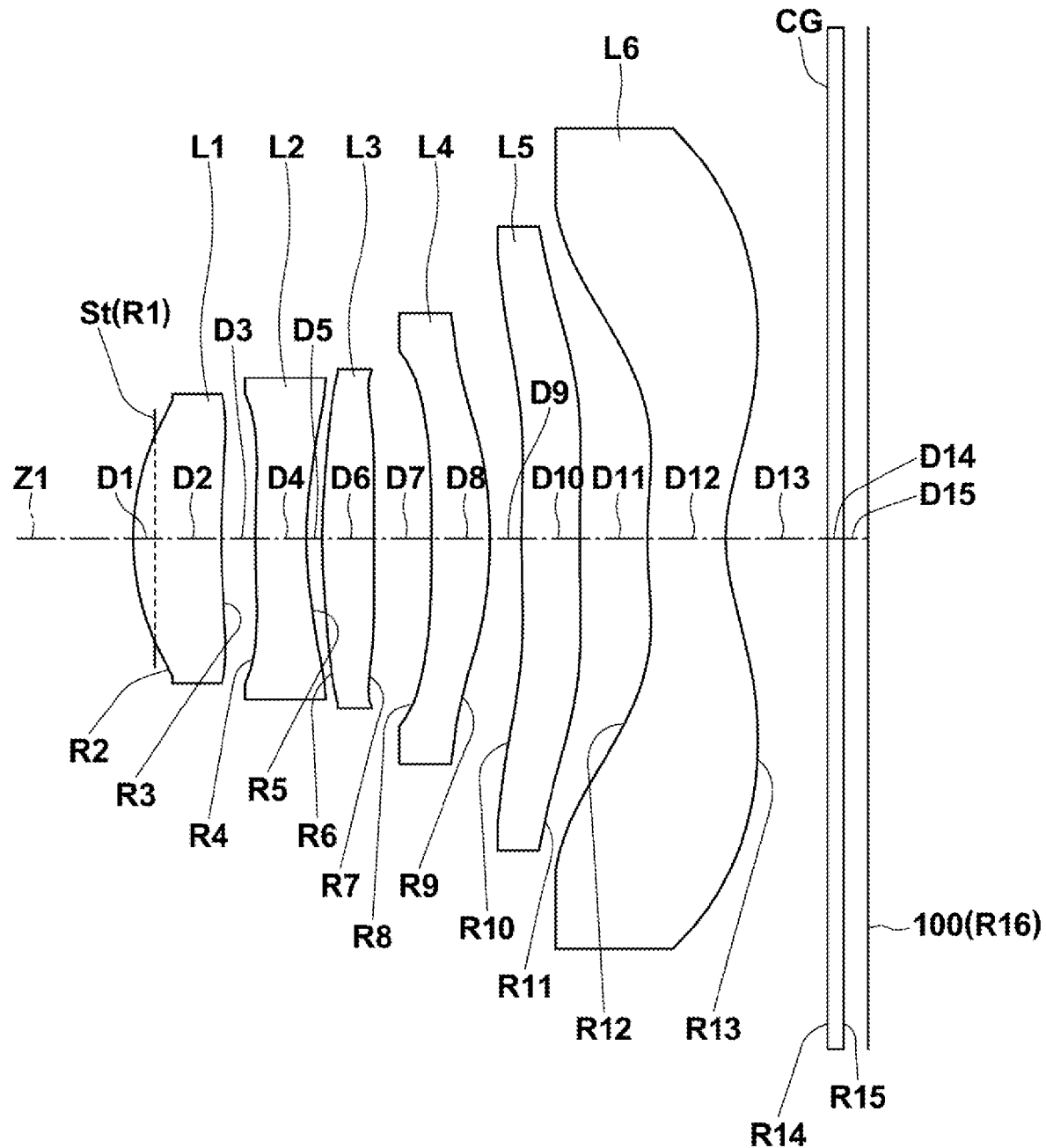
FIG. 2 illustrates a second configuration example of the imaging lens according to an embodiment of the present invention, which is a cross-sectional view of a lens corresponding to Example 2.
Figure 3:
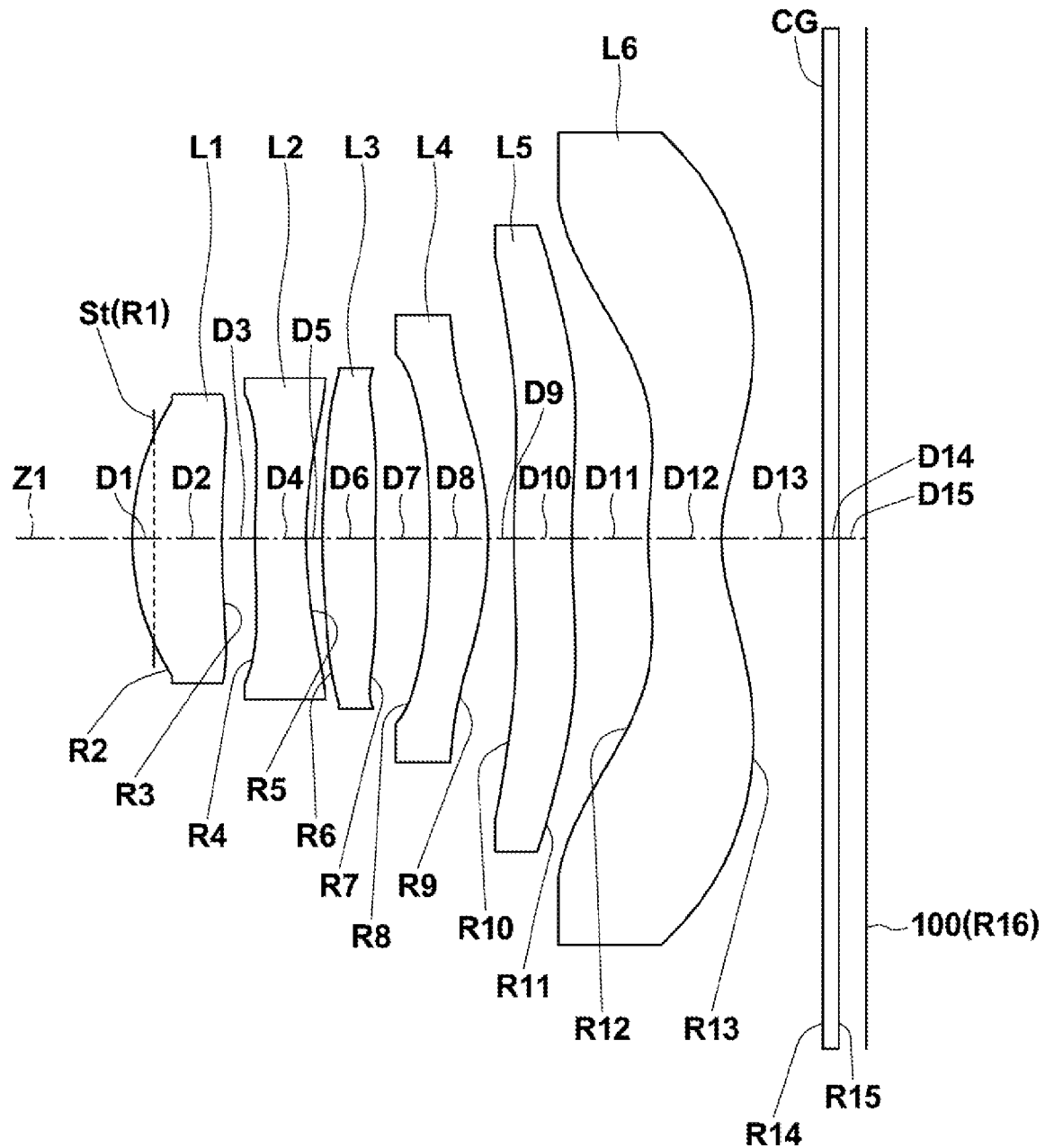
FIG. 3 illustrates a third configuration example of the imaging lens according to an embodiment of the present invention, which is a cross-sectional view of a lens corresponding to Example 3.
Figure 4:
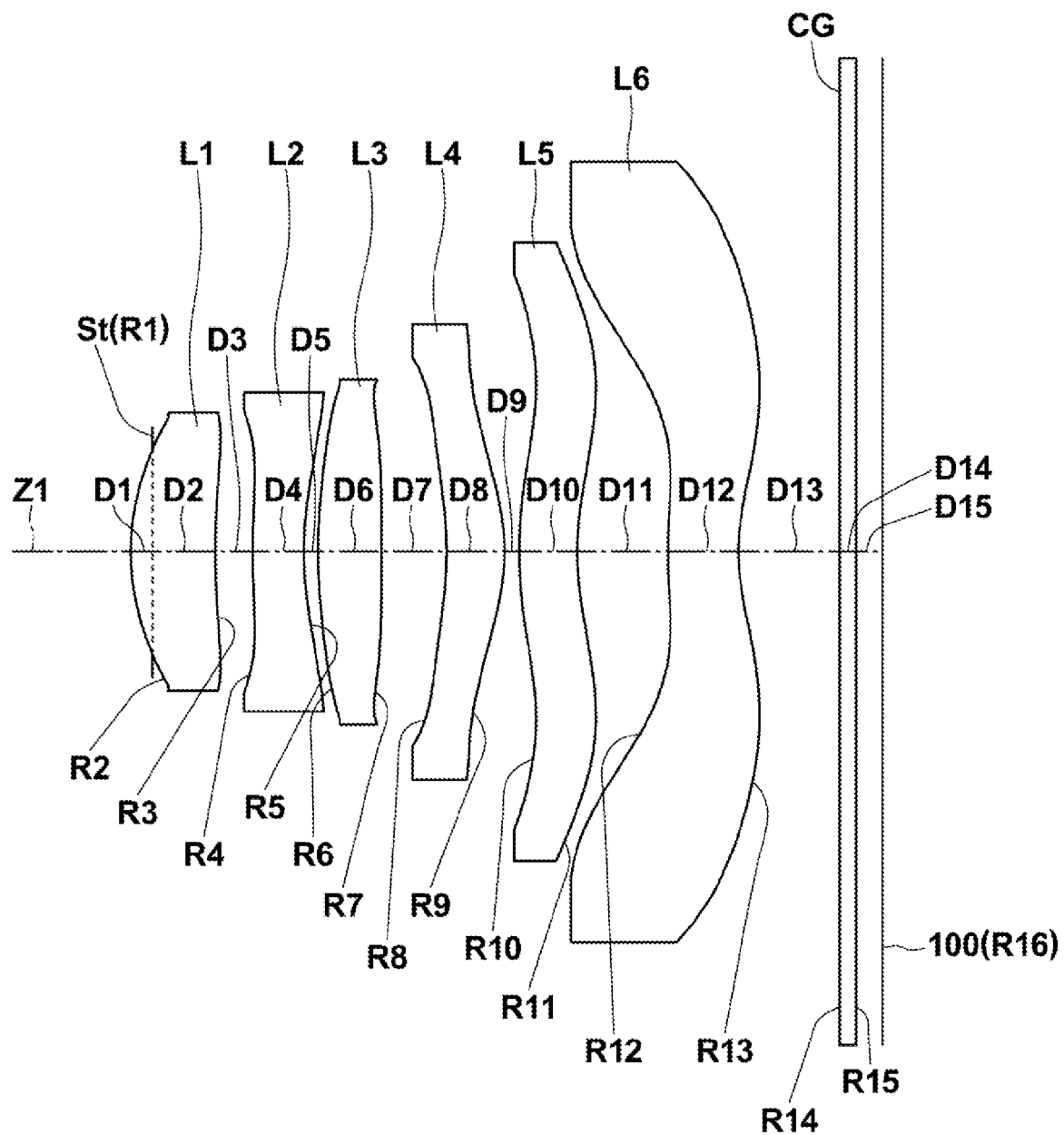
FIG. 4 illustrates a fourth configuration example of the imaging lens according to an embodiment of the present invention, which is a cross-sectional view of a lens corresponding to Example 4.
Figure 5:
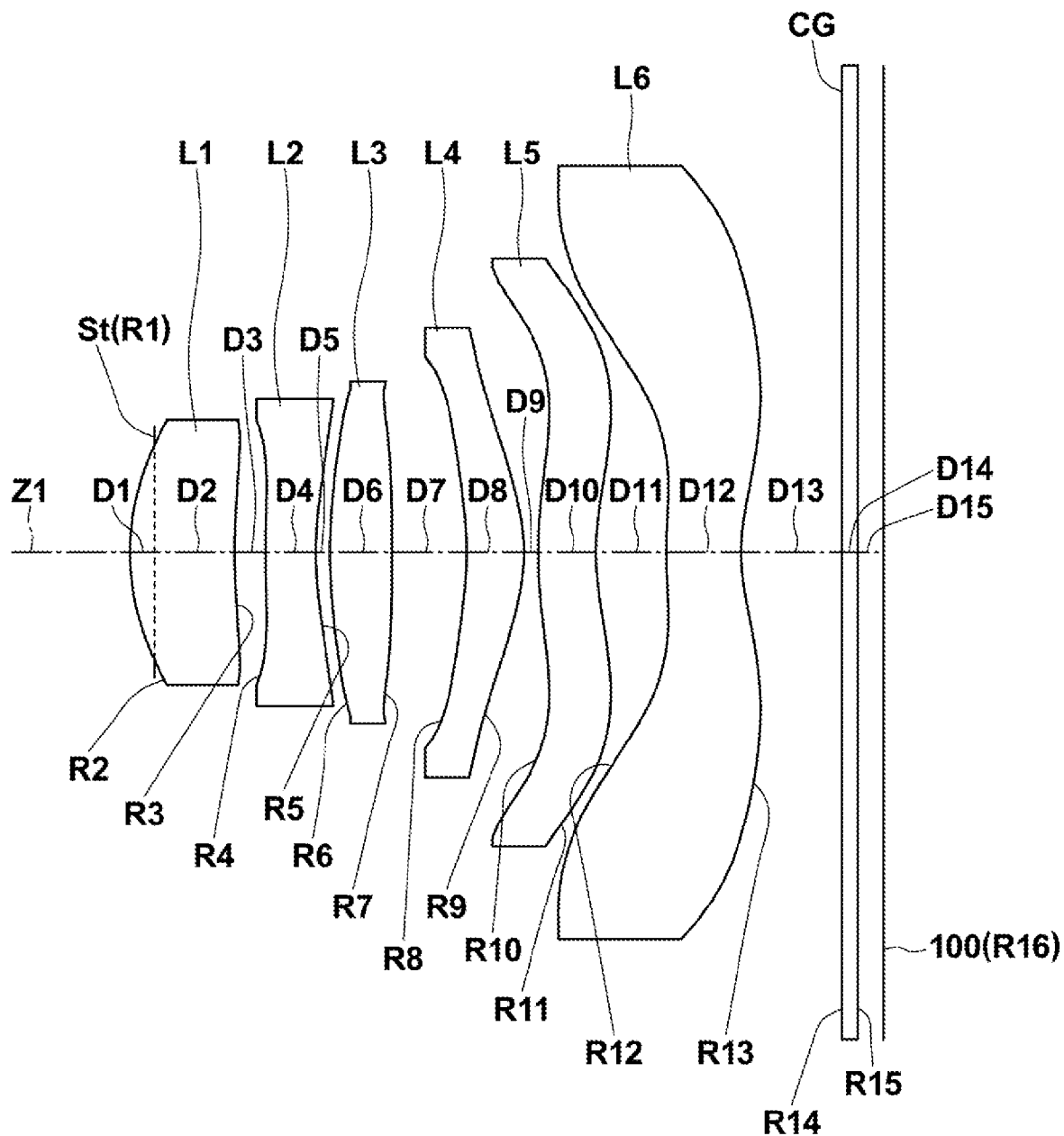
FIG. 5 illustrates a fifth configuration example of the imaging lens according to an embodiment of the present invention, which is a cross-sectional view of a lens corresponding to Example 5.
Figure 6:
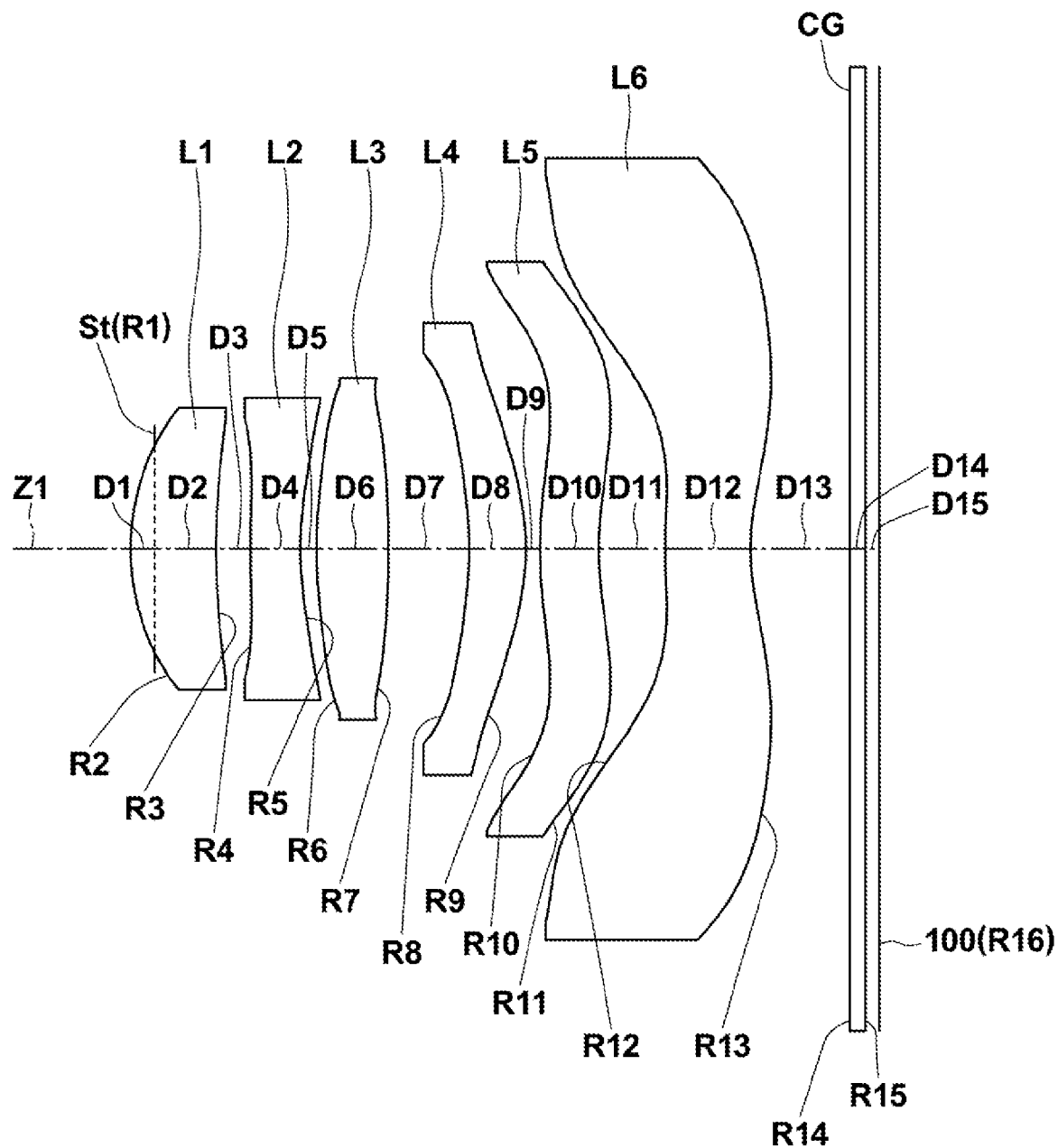
FIG. 6 illustrates a sixth configuration example of the imaging lens according to an embodiment of the present invention, which is a cross-sectional view of a lens corresponding to Example 6.
Figure 7:
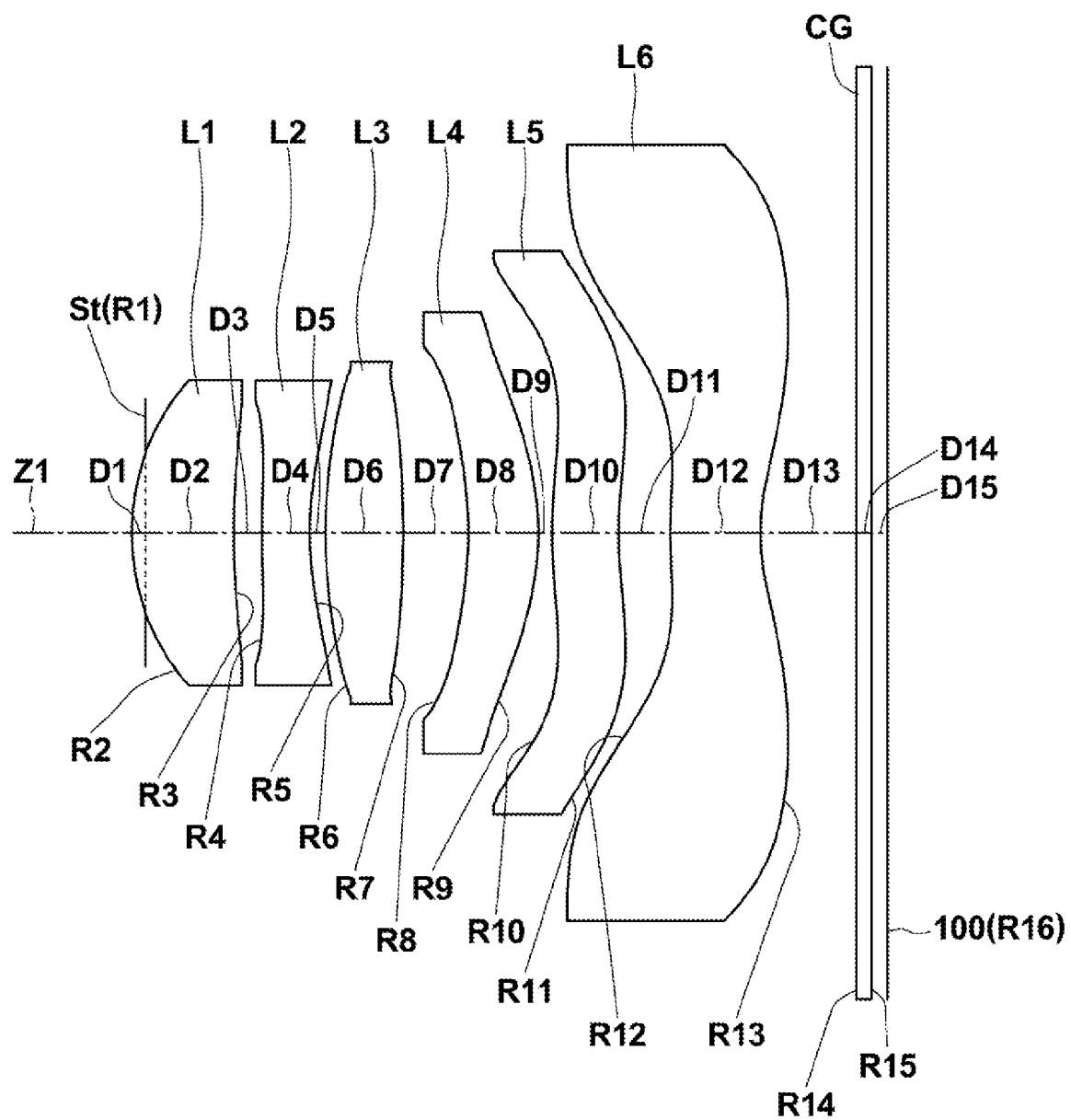
FIG. 7 illustrates a seventh configuration example of the imaging lens according to an embodiment of the present invention, which is a cross-sectional view of a lens corresponding to Example 7.
Figure 8:
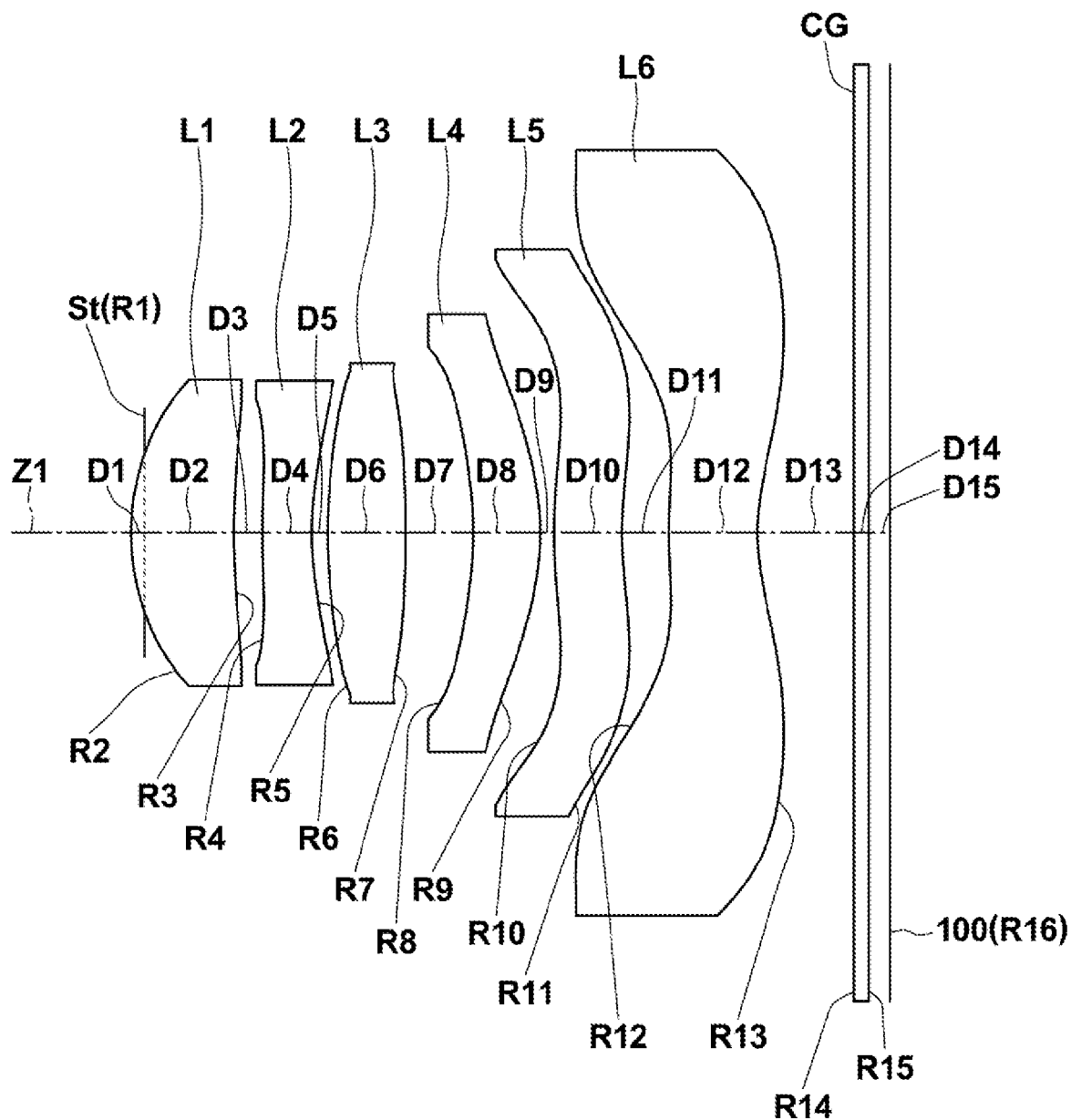
FIG. 8 illustrates a eighth configuration example of the imaging lens according to an embodiment of the present invention, which is a cross-sectional view of a lens corresponding to Example 8.
Figure 9:
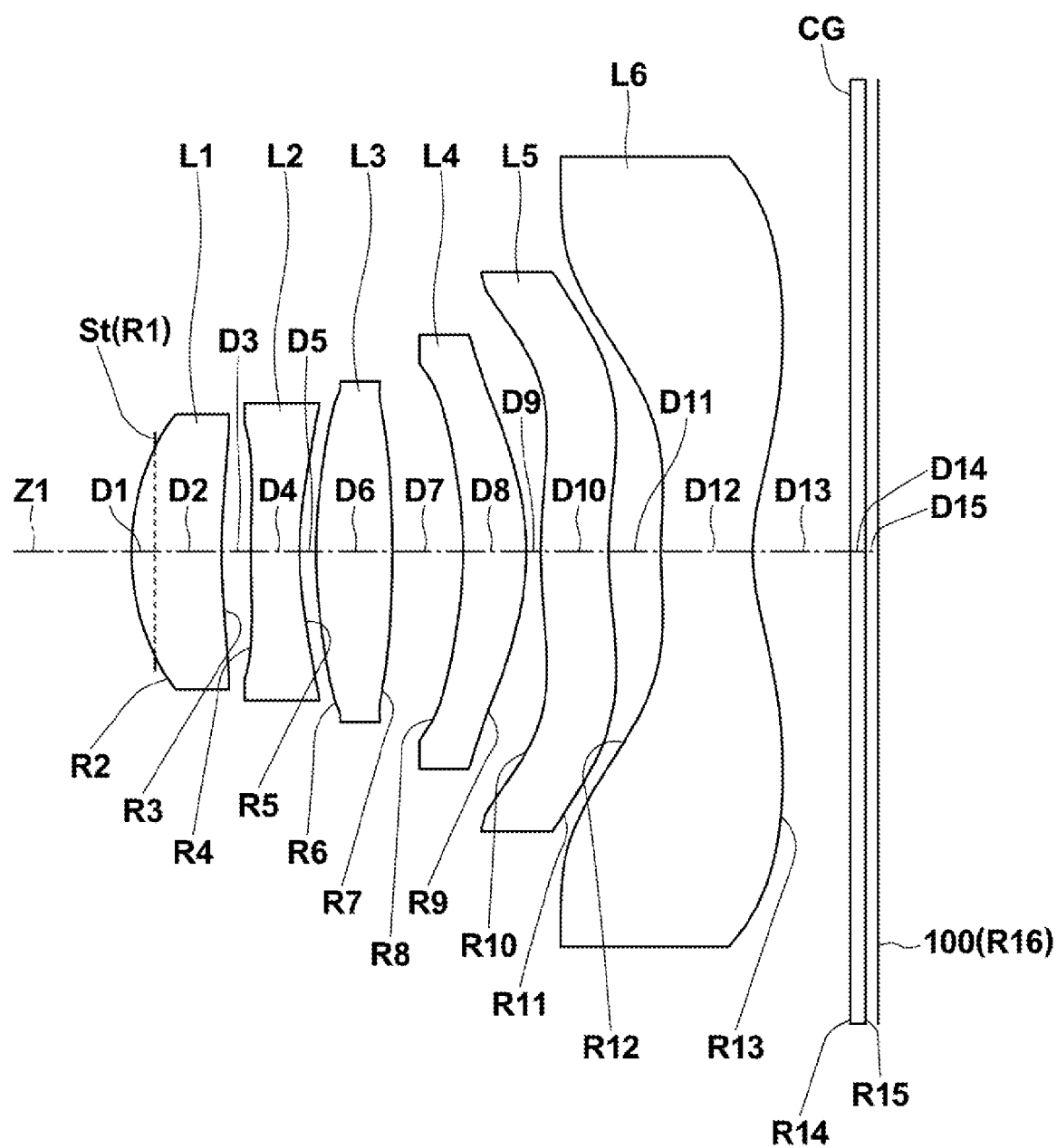
FIG. 9 illustrates a ninth configuration example of the imaging lens according to an embodiment of the present invention, which is a cross-sectional view of a lens corresponding to Example 9.
Figure 10:
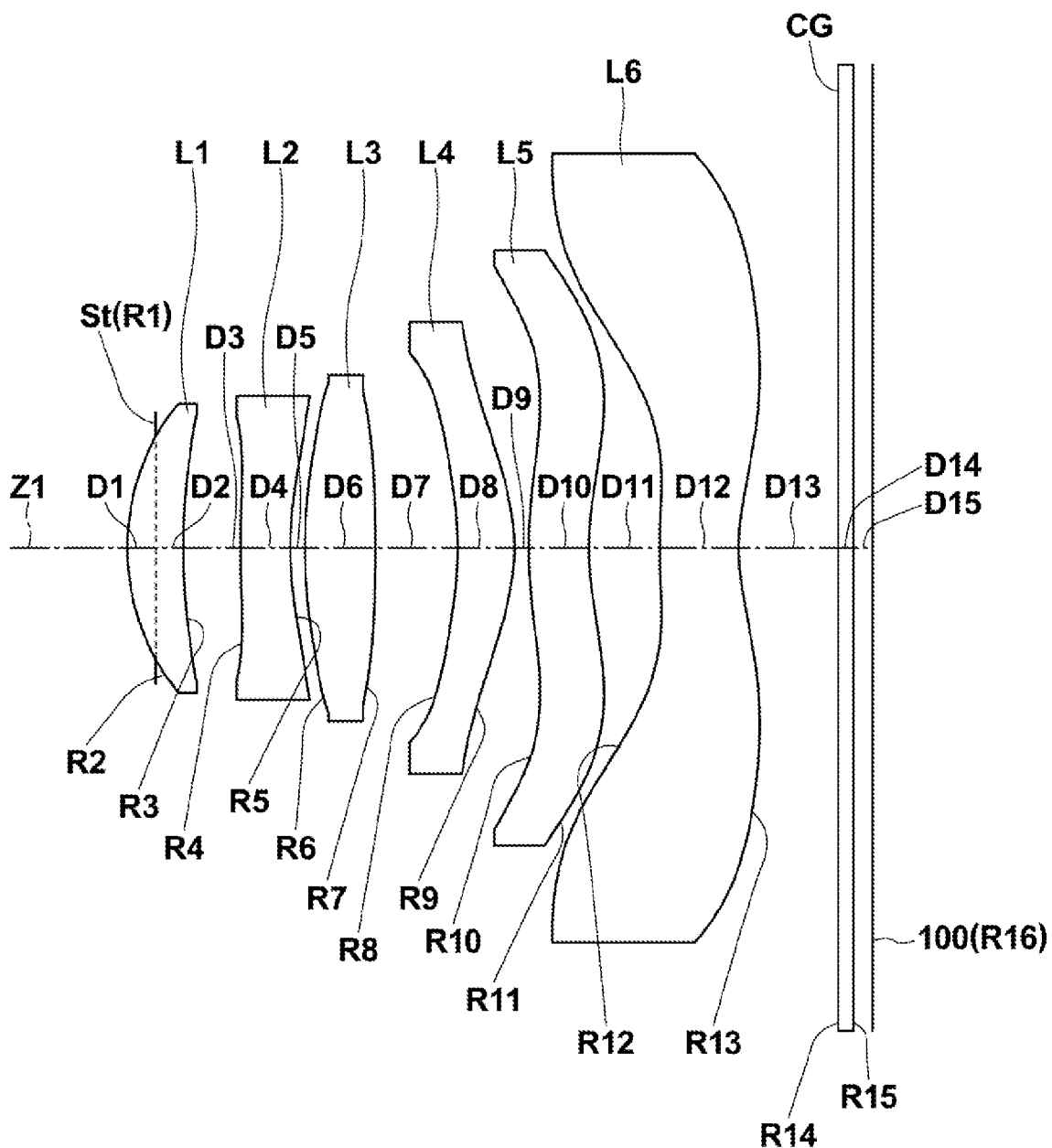
FIG. 10 illustrates a tenth configuration example of the imaging lens according to an embodiment of the present invention, which is a cross-sectional view of a lens corresponding to Example 10.
Figure 11:
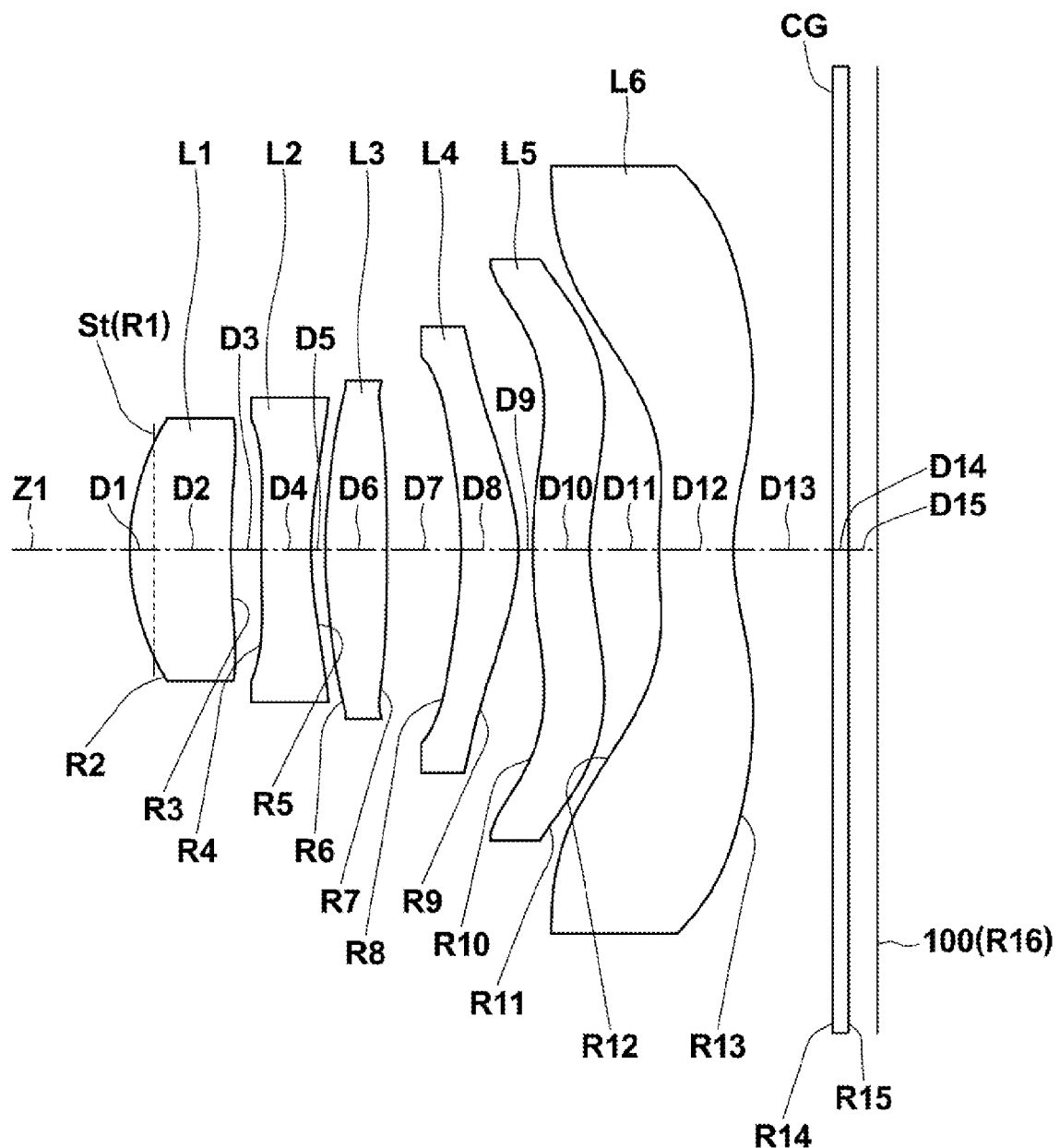
FIG. 11 illustrates a eleventh configuration example of the imaging lens according to an embodiment of the present invention, which is a cross-sectional view of a lens corresponding to Example 11.
Figure 12:
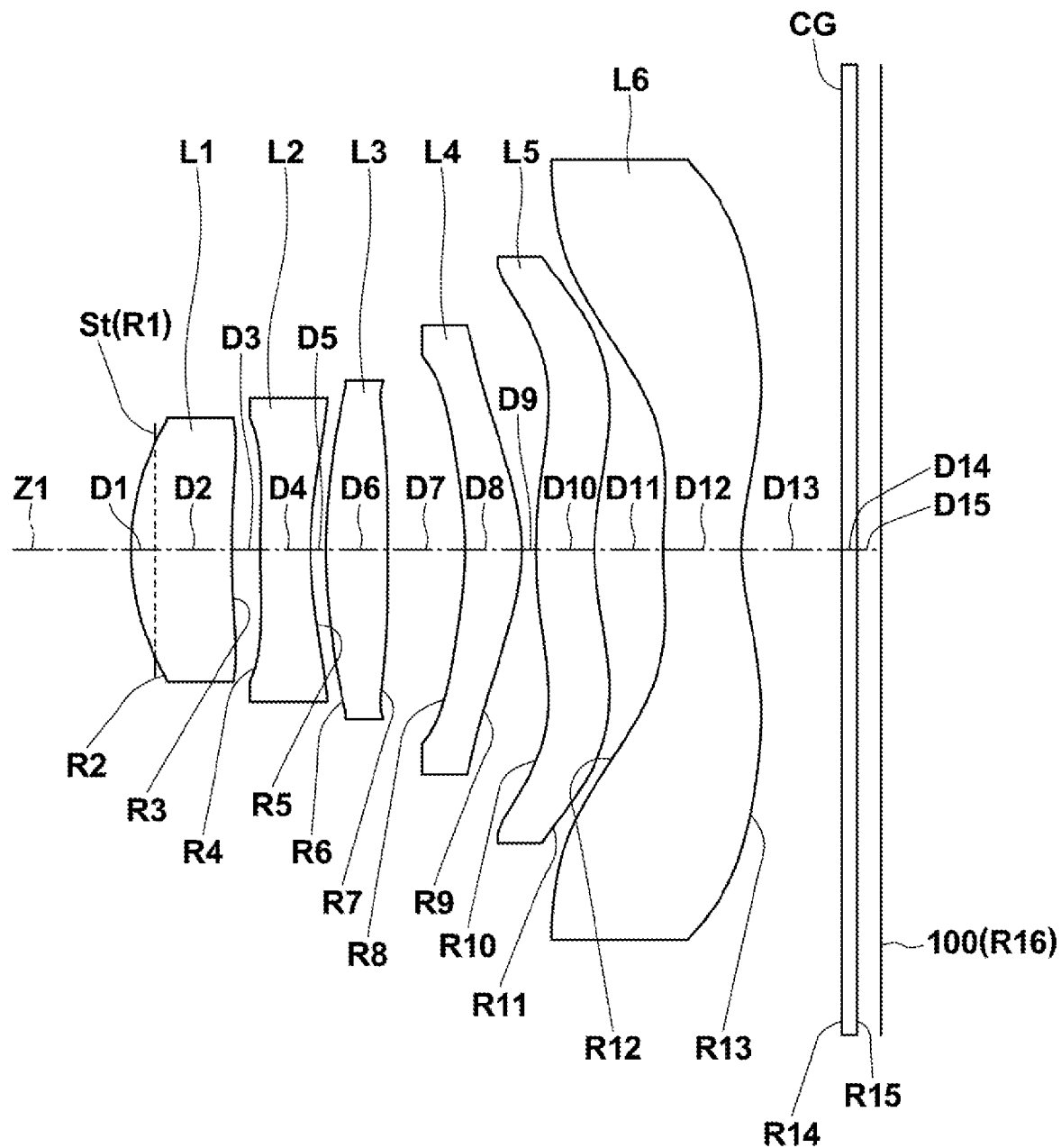
FIG. 12 illustrates a twelfth configuration example of the imaging lens according to an embodiment of the present invention, which is a cross-sectional view of a lens corresponding to Example 12.

As in the imaging lens of Example 1 described above, specific lens data corresponding to the configuration of imaging lens shown in FIG. 2 are taken as Example 2 and shown in Tables 2 and 14. Likewise, specific lens data corresponding to the configurations of imaging lenses shown in FIGS. 3 to 12 are taken as Examples 3 to 12 and shown in Tables 3 to 12 and Tables 15 to 24. In the imaging lens according to Examples 1 to 12, both surfaces of each of the first lens L1 to sixth lens L6 have aspherical shapes.

Figure 13:
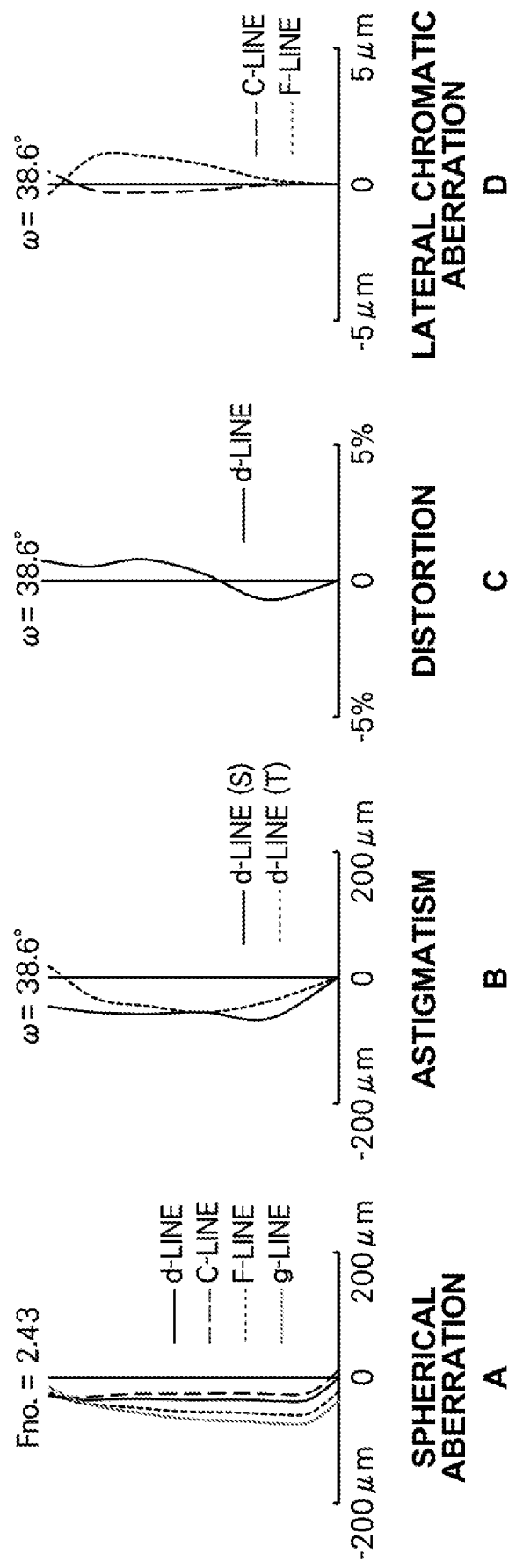
FIG. 13 shows aberration diagrams illustrating various types of aberrations of an imaging lens according to Example 1 of the present invention, in which A illustrates spherical aberration, B illustrates astigmatism (field curvature), C illustrates distortion, and D illustrates lateral chromatic aberration.

A to D of FIG. 13 are diagrams of spherical aberration, astigmatism, distortion (distortion aberration), and lateral chromatic aberration (chromatic aberration of magnification) for the imaging lens of Example 1. The diagrams of spherical aberration, astigmatism (field curvature), and distortion (distortion aberration) illustrate aberrations with the d-line (wavelength 587.56 nm) as the reference wavelength. The diagrams of spherical aberration and lateral chromatic aberration also illustrate aberrations with respect to the F-line (wavelength 486.1 nm) and C-line (wavelength 656.27 nm). The diagram of spherical aberration also illustrates aberration with respect to the g-line (wavelength 435.83 nm). In the diagram of astigmatism, the solid line represents aberration in the sagittal direction (S) and the broken line represents aberration in the tangential direction (T). The Fno represents an F-number and ω represents half angle of view.

Figure 14:
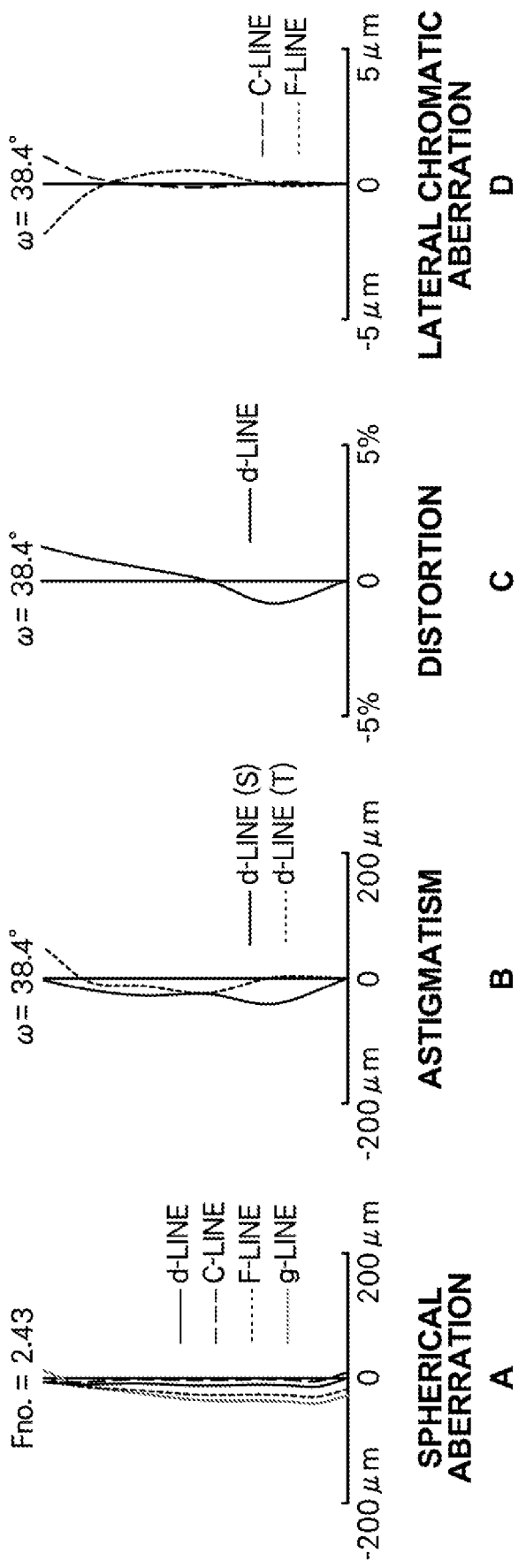
FIG. 14 shows aberration diagrams illustrating various types of aberrations of an imaging lens according to Example 2 of the present invention, in which A illustrates spherical aberration, B illustrates astigmatism (field curvature), C illustrates distortion, and D illustrates lateral chromatic aberration.
Figure 15:
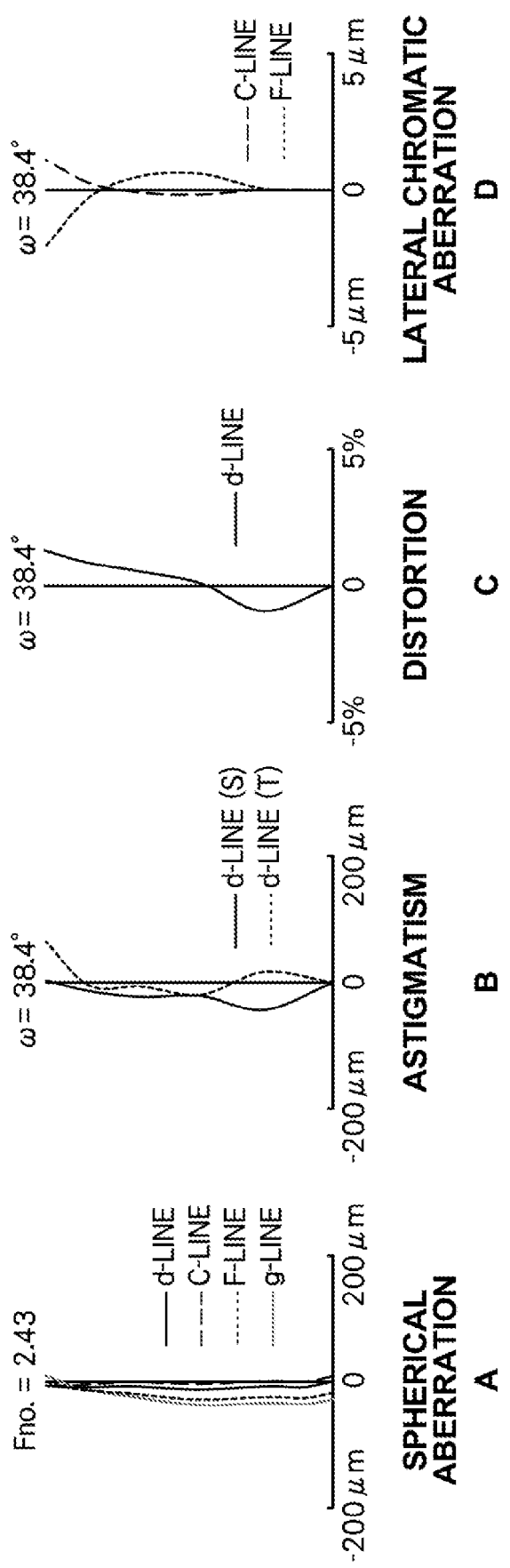
FIG. 15 shows aberration diagrams illustrating various types of aberrations of an imaging lens according to Example 3 of the present invention, in which A illustrates spherical aberration, B illustrates astigmatism (field curvature), C illustrates distortion, and D illustrates lateral chromatic aberration.
Figure 16:
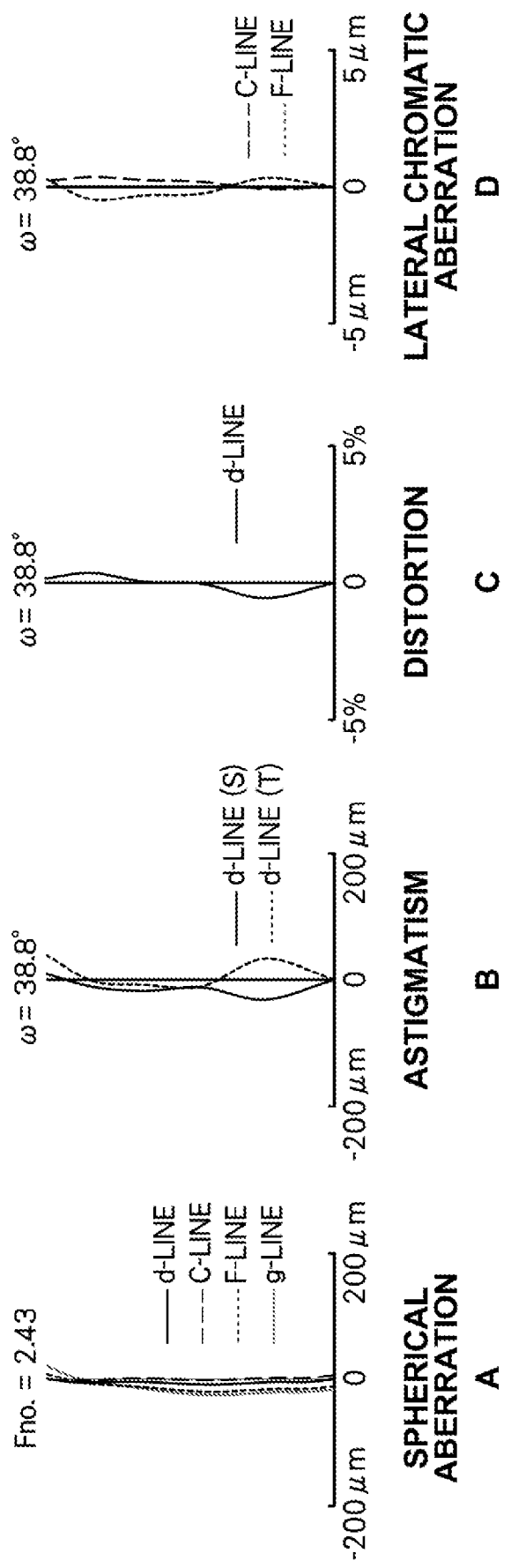
FIG. 16 shows aberration diagrams illustrating various types of aberrations of an imaging lens according to Example 4 of the present invention, in which A illustrates spherical aberration, B illustrates astigmatism (field curvature), C illustrates distortion, and D illustrates lateral chromatic aberration.
Figure 17:
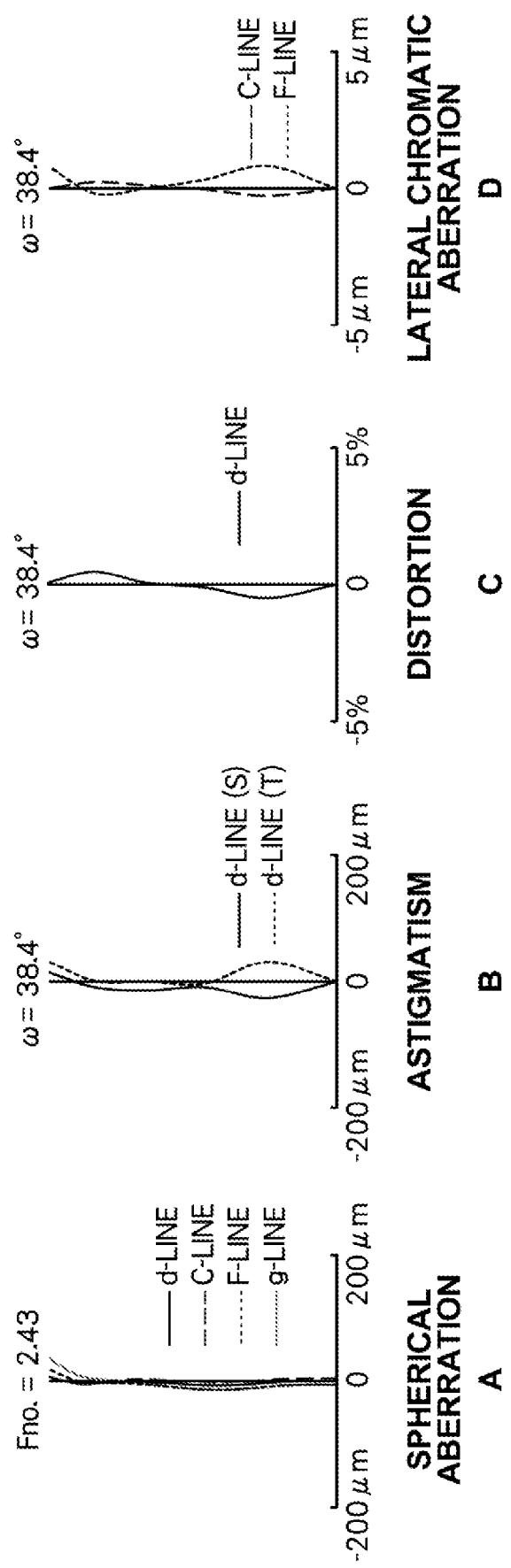
FIG. 17 shows aberration diagrams illustrating various types of aberrations of an imaging lens according to Example 5 of the present invention, in which A illustrates spherical aberration, B illustrates astigmatism (field curvature), C illustrates distortion, and D illustrates lateral chromatic aberration.
Figure 18:
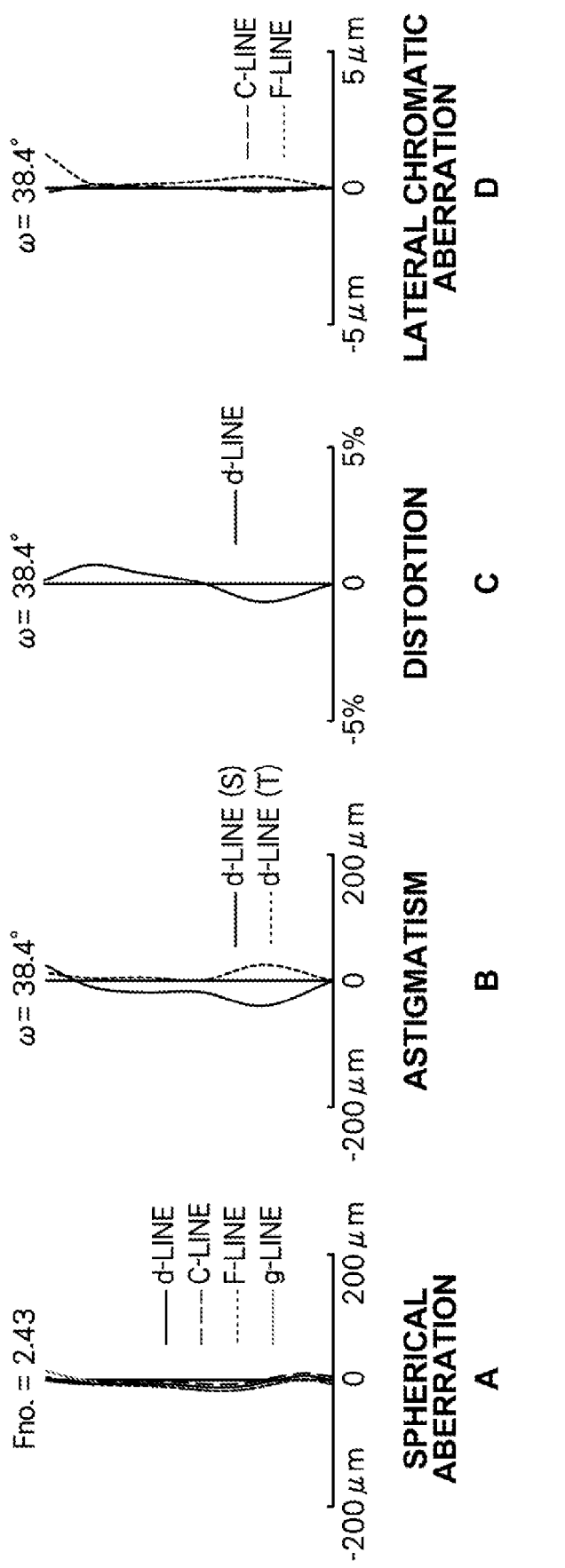
FIG. 18 shows aberration diagrams illustrating various types of aberrations of an imaging lens according to Example 6 of the present invention, in which A illustrates spherical aberration, B illustrates astigmatism (field curvature), C illustrates distortion, and D illustrates lateral chromatic aberration.
Figure 19:
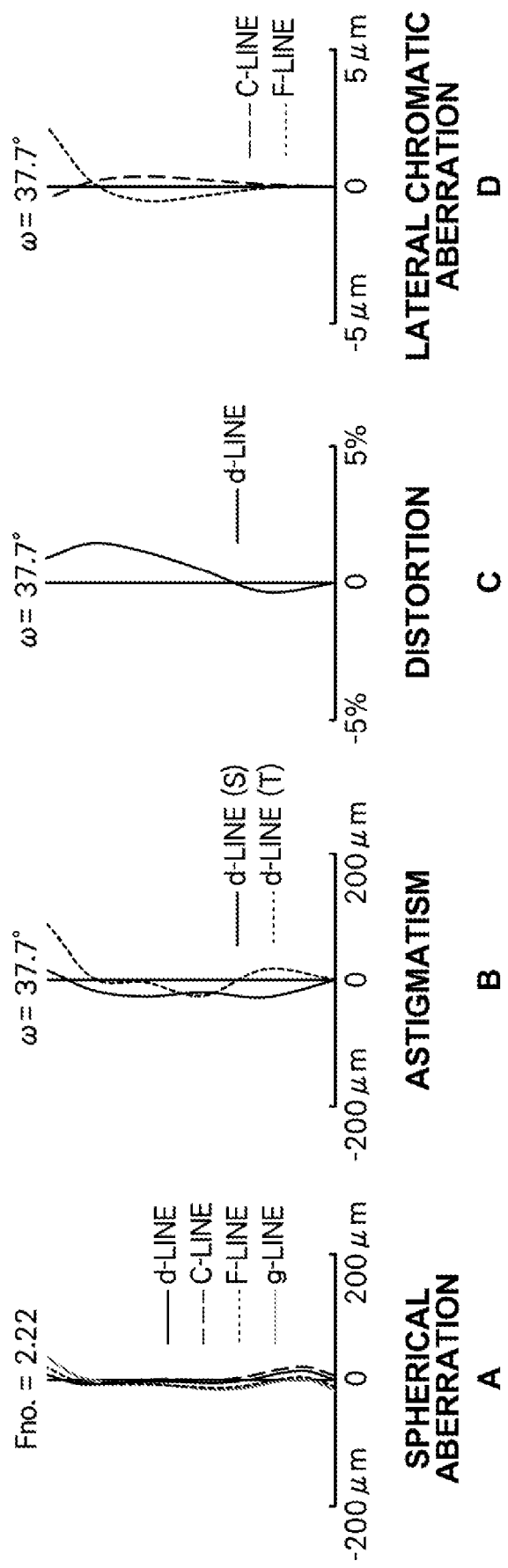
FIG. 19 shows aberration diagrams illustrating various types of aberrations of an imaging lens according to Example 7 of the present invention, in which A illustrates spherical aberration, B illustrates astigmatism (field curvature), C illustrates distortion, and D illustrates lateral chromatic aberration.
Figure 20:
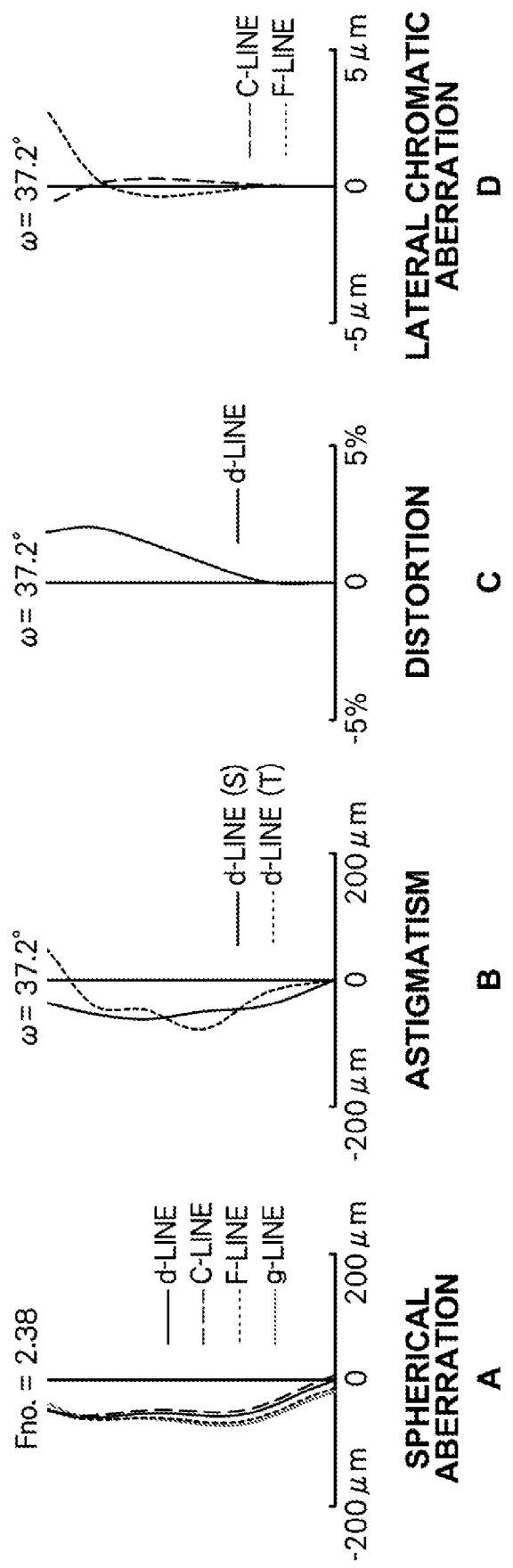
FIG. 20 shows aberration diagrams illustrating various types of aberrations of an imaging lens according to Example 8 of the present invention, in which A illustrates spherical aberration, B illustrates astigmatism (field curvature), C illustrates distortion, and D illustrates lateral chromatic aberration.
Figure 21:
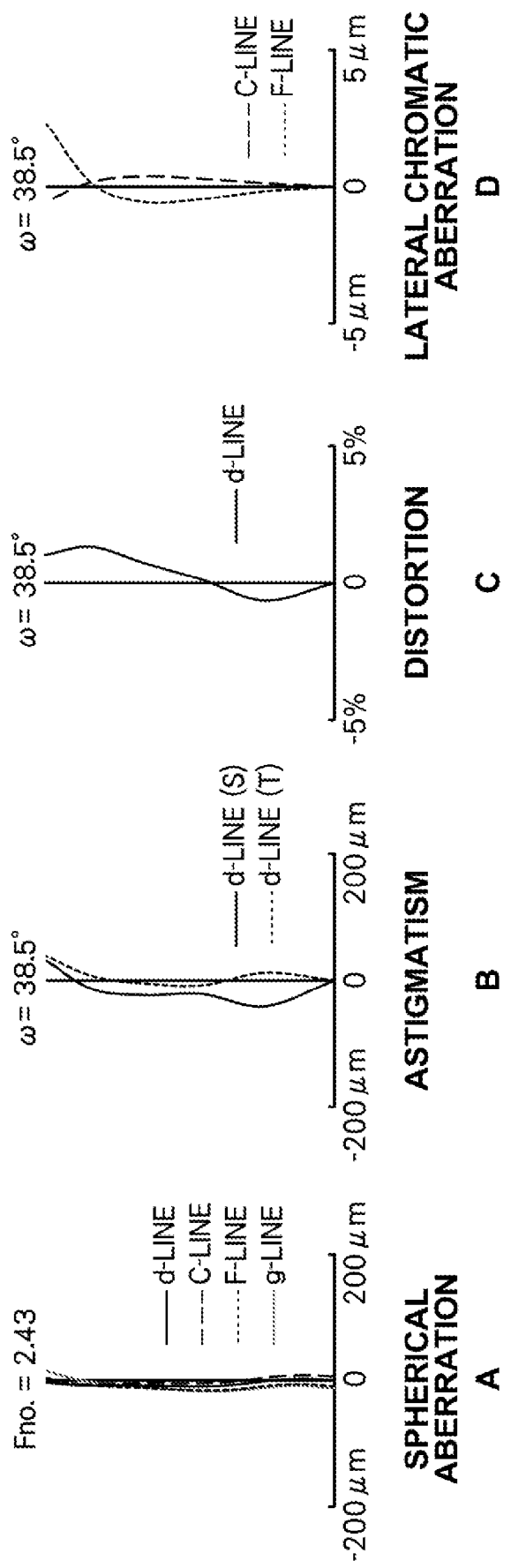
FIG. 21 shows aberration diagrams illustrating various types of aberrations of an imaging lens according to Example 9 of the present invention, in which A illustrates spherical aberration, B illustrates astigmatism (field curvature), C illustrates distortion, and D illustrates lateral chromatic aberration.
Figure 22:
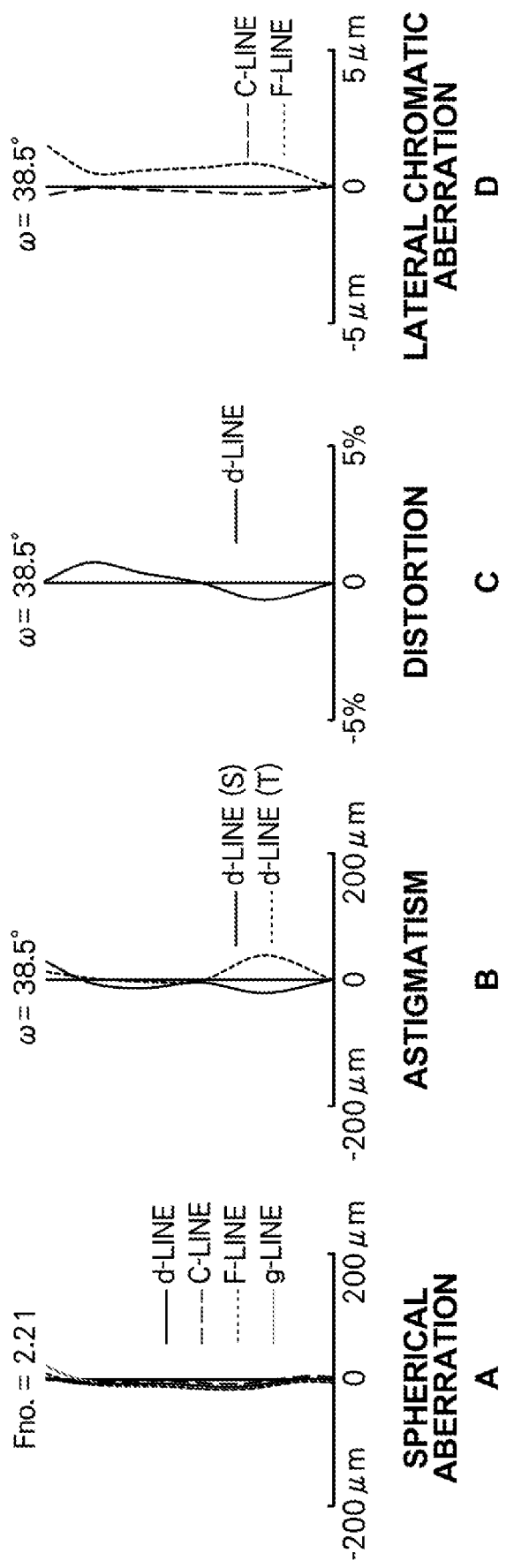
FIG. 22 shows aberration diagrams illustrating various types of aberrations of an imaging lens according to Example 10 of the present invention, in which A illustrates spherical aberration, B illustrates astigmatism (field curvature), C illustrates distortion, and D illustrates lateral chromatic aberration.
Figure 23:
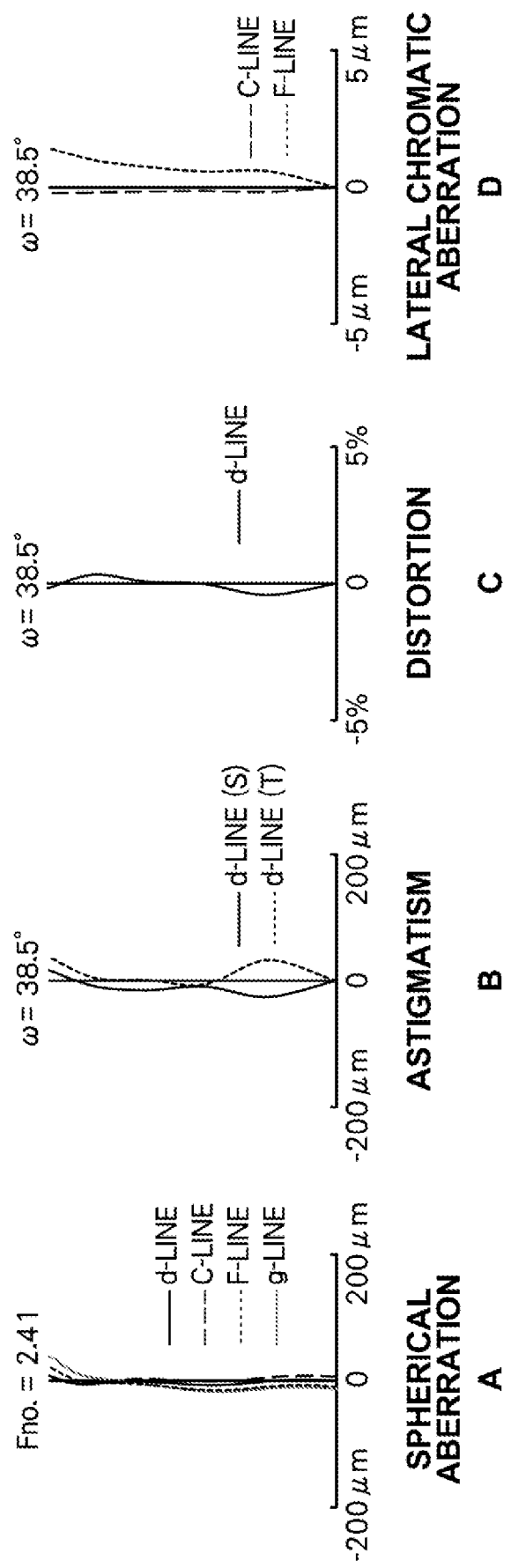
FIG. 23 shows aberration diagrams illustrating various types of aberrations of an imaging lens according to Example 11 of the present invention, in which A illustrates spherical aberration, B illustrates astigmatism (field curvature), C illustrates distortion, and D illustrates lateral chromatic aberration.
Figure 24:
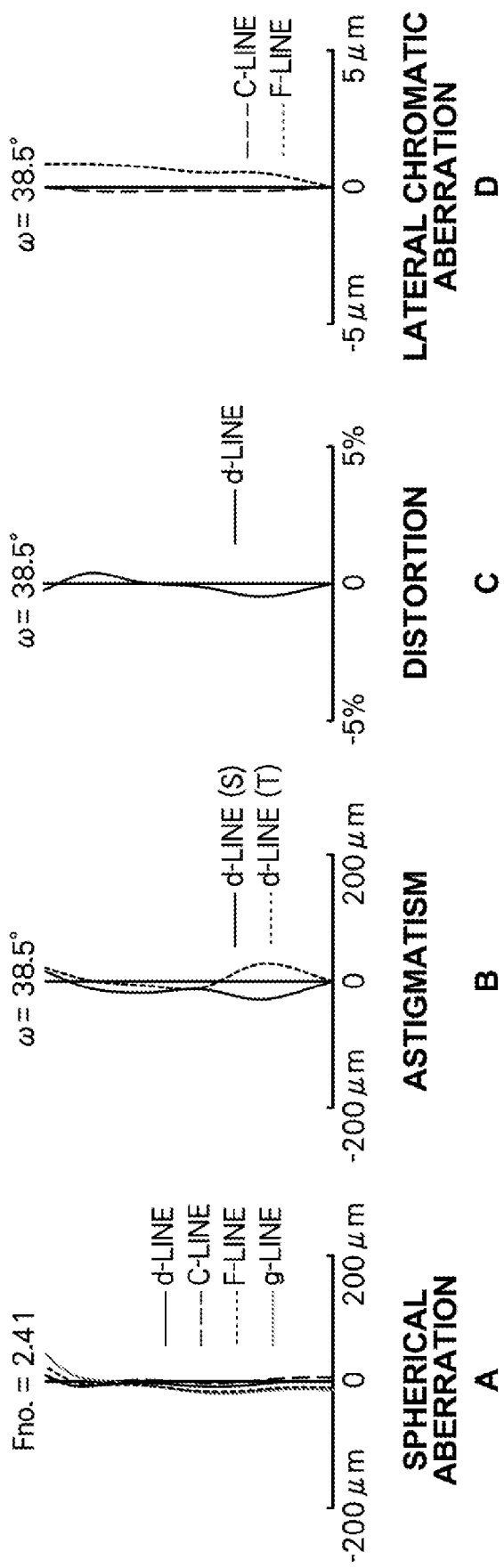
FIG. 24 shows aberration diagrams illustrating various types of aberrations of an imaging lens according to Example 12 of the present invention, in which A illustrates spherical aberration, B illustrates astigmatism (field curvature), C illustrates distortion, and D illustrates lateral chromatic aberration.

Likewise, various aberrations of the imaging lens of Example 2 are illustrated in A to D of FIG. 14. Similarly, various aberrations of imaging lenses of Example 3 to 12 are illustrated in A to D of FIG. 16 to A to D of FIG. 24.

Table 25 summarizes values of Examples 1 to 12 with respect to the conditional expressions (1) to (4) according to the present invention.

As is known from each numerical data and aberration diagram, high image quality is realized in each example along with the reduction in overall length.

It should be appreciated that the imaging lens of the present invention is not limited to the aforementioned embodiment and each example, and various modifications may be made. For example, values of the radius of curvature of each lens component, surface separation, refractive index, Abbe number, aspherical surface coefficient and the like are not limited to those shown in each numerical example and other values may also be possible.

Further, in each example, the description has been made on the assumption that the imaging lens is used as a fixed focal length lens. But it is possible to employ a configuration that allows focus adjustment. For example, it is also possible to employ a configuration that allows auto focusing by paying out the entire lens system or moving some of the lenses on the optical axis.

TABLE 1

EXAMPLE 1
f = 4.238, Bf = 0.915, FNo. = 2.43, 2ω = 77.2, TL = 5.275

| Si | Ri | Di | Ndj | vdj |
|---|---|---|---|---|
| 1 (A-Stop) | ∞ | −0.149 | | |
| *2 | 1.7696 | 0.698 | 1.53391 | 55.89 |
| *3 | 7.0252 | 0.174 | | |
| *4 | 7.7556 | 0.350 | 1.63351 | 23.63 |
| *5 | 2.9153 | 0.128 | | |
| *6 | 5.3621 | 0.367 | 1.53391 | 55.89 |
| *7 | 12.5103 | 0.386 | | |
| *8 | 19.2408 | 0.400 | 1.54488 | 54.87 |
| *9 | −5.1641 | 0.217 | | |
| *10 | 15.1589 | 0.400 | 1.53391 | 55.89 |
| *11 | 12.7271 | 0.438 | | |
| *12 | 3.1221 | 0.548 | 1.53391 | 55.89 |
| *13 | 1.3109 | 0.700 | | |
| 14 | ∞ | 0.110 | 1.51633 | 64.14 |
| 15 | ∞ | 0.144 | | |
| 16 (I-Plane) | ∞ | | | |

*Aspherical Surface
A-Stop: Aperture Stop
I-Plane: Image Plane

TABLE 2

EXAMPLE 2
f = 4.356, Bf = 0.941, FNo. = 2.43, 2ω = 76.8, TL = 5.296

| Si | Ri | Di | Ndj | vdj |
|---|---|---|---|---|
| 1 (A-Stop) | ∞ | −0.149 | | |
| *2 | 1.7448 | 0.609 | 1.53391 | 55.89 |
| *3 | 6.0663 | 0.234 | | |
| *4 | 7.2212 | 0.350 | 1.63351 | 23.63 |
| *5 | 2.5927 | 0.108 | | |
| *6 | 3.8231 | 0.356 | 1.53391 | 55.89 |
| *7 | 12.0343 | 0.397 | | |
| *8 | −16.7344 | 0.400 | 1.54488 | 54.87 |
| *9 | −3.4533 | 0.220 | | |
| *10 | 13.9817 | 0.400 | 1.63351 | 23.63 |
| *11 | 12.7063 | 0.464 | | |
| *12 | 2.7467 | 0.542 | 1.53391 | 55.89 |
| *13 | 1.2061 | 0.700 | | |
| 14 | ∞ | 0.110 | 1.51633 | 64.14 |
| 15 | ∞ | 0.168 | | |
| 16 (I-Plant) | ∞ | | | |

*Aspherical Surface
A-Stop: Aperture Stop
I-Plane: Image Plane

TABLE 3

EXAMPLE 3
f = 4.354, Bf = 0.958, FNo. = 2.43, 2ω = 76.8, TL = 5.314

| Si | Ri | Di | Ndj | vdj |
|---|---|---|---|---|
| 1 (A-Stop) | ∞ | −0.149 | | |
| *2 | 1.7472 | 0.620 | 1.53391 | 55.89 |
| *3 | 6.0042 | 0.228 | | |
| *4 | 6.8073 | 0.350 | 1.63351 | 23.63 |
| *5 | 2.6134 | 0.113 | | |
| *6 | 3.9303 | 0.366 | 1.53391 | 55.89 |
| *7 | 12.6568 | 0.377 | | |
| *8 | −6.5592 | 0.400 | 1.54488 | 54.87 |
| *9 | −2.5198 | 0.178 | | |
| *10 | 10.1554 | 0.400 | 1.63351 | 23.63 |
| *11 | 6.8522 | 0.523 | | |

TABLE 3-continued

EXAMPLE 3
f = 4.354, Bf = 0.958, FNo. = 2.43, 2ω = 76.8, TL = 5.314

| Si | Ri | Di | Ndj | νdj |
|---|---|---|---|---|
| *12 | 2.5794 | 0.508 | 1.53391 | 55.89 |
| *13 | 1.2231 | 0.700 | | |
| 14 | ∞ | 0.110 | 1.51633 | 64.14 |
| 15 | ∞ | 0.186 | | |
| 16 (I-Plane) | ∞ | | | |

*Aspherical Surface
A-Stop: Aperture Stop
I-Plane: Image Plane

TABLE 4

EXAMPLE 4
f = 4.352, Bf = 0.954, FNo. = 2.43, 2ω = 77.6, TL = 5.306

| Si | Ri | Di | Ndj | νdj |
|---|---|---|---|---|
| 1 (A-Stop) | ∞ | −0.149 | | |
| *2 | 1.8408 | 0.579 | 1.53391 | 55.89 |
| *3 | 5.1626 | 0.262 | | |
| *4 | 5.5353 | 0.350 | 1.63351 | 23.63 |
| *5 | 2.4568 | 0.101 | | |
| *6 | 4.1761 | 0.435 | 1.53391 | 55.89 |
| *7 | −70.6097 | 0.447 | | |
| *8 | −2.5854 | 0.400 | 1.54488 | 54.87 |
| *9 | −1.3138 | 0.100 | | |
| *10 | 4.1331 | 0.400 | 1.63351 | 23.63 |
| *11 | 2.0043 | 0.622 | | |
| *12 | 3.2525 | 0.487 | 1.53391 | 55.89 |
| *13 | 1.5122 | 0.700 | | |
| 14 | ∞ | 0.110 | 1.51633 | 64.14 |
| 15 | ∞ | 0.182 | | |
| 16 (I-Plane) | ∞ | | | |

*Aspherical Surface
A-Stop: Aperture Stop
I-Plane: Image Plane

TABLE 5

EXAMPLE 5
f = 4.408, Bf = 0.950, FNo. = 2.43, 2ω = 76.8, TL = 5.359

| Si | Ri | Di | Ndj | νdj |
|---|---|---|---|---|
| 1 (A-Stop) | ∞ | −0.169 | | |
| *2 | 1.8526 | 0.728 | 1.53391 | 55.89 |
| *3 | 5.3790 | 0.216 | | |
| *4 | 7.9008 | 0.350 | 1.63351 | 23.63 |
| *5 | 2.7098 | 0.100 | | |
| *6 | 3.8294 | 0.429 | 1.53391 | 55.89 |
| *7 | −49.0566 | 0.520 | | |
| *8 | −2.6023 | 0.400 | 1.53391 | 55.89 |
| *9 | −1.2476 | 0.100 | | |
| *10 | 4.5059 | 0.400 | 1.63351 | 23.63 |
| *11 | 1.8318 | 0.491 | | |
| *12 | 3.2337 | 0.524 | 1.53391 | 55.89 |
| *13 | 1.5390 | 0.700 | | |
| 14 | ∞ | 0.110 | 1.51633 | 64.14 |
| 15 | ∞ | 0.178 | | |
| 16 (I-Plane) | ∞ | | | |

*Aspherical Surface
A-Stop: Aperture Stop
I-Plane: Image Plane

TABLE 6

EXAMPLE 6
f = 4.410, Bf = 0.866, FNo. = 2.43, 2ω = 76.8, TL = 5.278

| Si | Ri | Di | Ndj | νdj |
|---|---|---|---|---|
| 1 (A-Stop) | ∞ | −0.169 | | |
| *2 | 1.7821 | 0.600 | 1.53391 | 55.89 |
| *3 | 5.0294 | 0.246 | | |
| *4 | 8.0222 | 0.350 | 1.63351 | 23.63 |
| *5 | 2.5381 | 0.112 | | |
| *6 | 3.8200 | 0.506 | 1.53391 | 55.89 |
| *7 | −10.3589 | 0.566 | | |
| *8 | −2.8145 | 0.400 | 1.53391 | 55.89 |
| *9 | −1.5902 | 0.100 | | |
| *10 | 4.4851 | 0.411 | 1.63351 | 23.63 |
| *11 | 2.2798 | 0.469 | | |
| *12 | 4.5319 | 0.600 | 1.53391 | 55.89 |
| *13 | 1.7356 | 0.700 | | |
| 14 | ∞ | 0.110 | 1.51633 | 64.14 |
| 15 | ∞ | 0.095 | | |
| 16 (I-Plane) | ∞ | | | |

*Aspherical Surface
A-Stop: Aperture Stop
I-Plane: Image Plane

TABLE 7

EXAMPLE 7
f = 4.493, Bf = 0.888, FNo. = 2.22, 2ω = 75.4, TL = 5.381

| Si | Ri | Di | Ndj | νdj |
|---|---|---|---|---|
| 1 (A-Stop) | ∞ | −0.099 | | |
| *2 | 1.8715 | 0.742 | 1.53391 | 55.89 |
| *3 | 5.6301 | 0.206 | | |
| *4 | 7.0098 | 0.350 | 1.63351 | 23.63 |
| *5 | 2.4863 | 0.113 | | |
| *6 | 3.8459 | 0.567 | 1.53391 | 55.89 |
| *7 | −10.1985 | 0.473 | | |
| *8 | −2.8531 | 0.513 | 1.53391 | 55.89 |
| *9 | −1.9567 | 0.100 | | |
| *10 | 4.6126 | 0.485 | 1.63351 | 23.63 |
| *11 | 2.9198 | 0.377 | | |
| *12 | 4.1246 | 0.659 | 1.53391 | 55.89 |
| *13 | 1.6973 | 0.700 | | |
| 14 | ∞ | 0.110 | 1.51633 | 64.14 |
| 15 | ∞ | 0.116 | | |
| 16 (I-Plane) | ∞ | | | |

*Aspherical Surface
A-Stop: Aperture Stop
I-Plane: Image Plane

TABLE 8

EXAMPLE 8
f = 4.532, Bf = 0.925, FNo. = 2.38, 2ω = 74.4, TL = 5.459

| Si | Ri | Di | Ndj | νdj |
|---|---|---|---|---|
| 1 (A-Stop) | ∞ | −0.099 | | |
| *2 | 1.8609 | 0.748 | 1.53391 | 55.89 |
| *3 | 5.7157 | 0.207 | | |
| *4 | 6.8070 | 0.360 | 1.63351 | 23.63 |
| *5 | 2.4950 | 0.115 | | |
| *6 | 4.1363 | 0.568 | 1.53391 | 55.89 |
| *7 | −10.4865 | 0.489 | | |
| *8 | −2.8375 | 0.486 | 1.53391 | 55.89 |
| *9 | −1.9578 | 0.104 | | |
| *10 | 4.5681 | 0.490 | 1.63351 | 23.63 |
| *11 | 2.8568 | 0.341 | | |
| *12 | 3.8981 | 0.644 | 1.53391 | 55.89 |
| *13 | 1.7249 | 0.700 | | |
| 14 | ∞ | 0.110 | 1.51633 | 64.14 |

TABLE 8-continued

EXAMPLE 8
f = 4.532, Bf = 0.925, FNo. = 2.38, 2ω = 74.4, TL = 5.459

| Si | Ri | Di | Ndj | νdj |
|---|---|---|---|---|
| 15 | ∞ | 0.153 | | |
| 16 (I-Plane) | ∞ | | | |

*Aspherical Surface
A-Stop: Aperture Stop
I-Plane: Image Plane

TABLE 9

EXAMPLE 9
f = 4.349, Bf = 0.863, FNo. = 2.43, 2ω = 77.0. TL = 5.213

| Si | Ri | Di | Ndj | νdj |
|---|---|---|---|---|
| 1 (A-Stop) | ∞ | −0.169 | | |
| *2 | 1.8602 | 0.653 | 1.53391 | 55.89 |
| *3 | 5.7298 | 0.208 | | |
| *4 | 7.7514 | 0.350 | 1.63351 | 23.63 |
| *5 | 2.5198 | 0.118 | | |
| *6 | 3.7346 | 0.550 | 1.53391 | 55.89 |
| *7 | −10.0126 | 0.508 | | |
| *8 | −2.8056 | 0.455 | 1.53391 | 55.89 |
| *9 | −1.8804 | 0.103 | | |
| *10 | 4.4669 | 0.490 | 1.63351 | 23.63 |
| *11 | 2.8848 | 0.374 | | |
| *12 | 4.0788 | 0.662 | 1.53391 | 55.89 |
| *13 | 1.6259 | 0.700 | | |
| 14 | ∞ | 0.110 | 1.51633 | 64.14 |
| 15 | ∞ | 0.091 | | |
| 16 (I-Plane) | ∞ | | | |

*Aspiterical Surface
A-Stop: Aperture Stop
I-Plane: Image Plane

TABLE 10

EXAMPLE 10
f = 4.403, Bf = 0.905. FNo. = 2.21, 2ω = 77.0, TL = 5.305

| Si | Ri | Di | Ndj | νdj |
|---|---|---|---|---|
| 1 (A-Stop) | ∞ | −0.199 | | |
| *2 | 1.7693 | 0.393 | 1.53391 | 55.89 |
| *3 | 4.5582 | 0.405 | | |
| *4 | 6.6651 | 0.350 | 1.63351 | 23.63 |
| *5 | 2.4345 | 0.103 | | |
| *6 | 3.4614 | 0.495 | 1.53391 | 55.89 |
| *7 | −15.2361 | 0.581 | | |
| *8 | −2.4683 | 0.400 | 1.53391 | 55.89 |
| *9 | −1.3448 | 0.100 | | |
| *10 | 4.3233 | 0.421 | 1.63351 | 23.63 |
| *11 | 1.9807 | 0.499 | | |
| *12 | 4.0773 | 0.559 | 1.53391 | 55.89 |
| *13 | 1.6766 | 0.700 | | |
| 14 | ∞ | 0.110 | 1.51633 | 64.14 |
| 15 | ∞ | 0.131 | | |
| 16 (I-Plane) | ∞ | | | |

*Aspherical Surface
A-Stop: Aperture Stop
I-Plane: Image Plane

TABLE 11

EXAMPLE 11
f = 4.410, Bf = 0.976. FNo. = 2.41, 2ω = 77.0, TL = 5.384

| Si | Ri | Di | Ndj | νdj |
|---|---|---|---|---|
| 1 (A-Stop) | ∞ | −0.169 | | |
| *2 | 1.8543 | 0.711 | 1.53391 | 55.89 |
| *3 | 5.5821 | 0.213 | | |
| *4 | 8.5981 | 0.350 | 1.63351 | 23.63 |
| *5 | 2.6796 | 0.100 | | |
| *6 | 3.7854 | 0.432 | 1.53391 | 55.89 |
| *7 | −43.3217 | 0.523 | | |
| *8 | −2.6125 | 0.400 | 1.53391 | 55.89 |
| *9 | −1.2528 | 0.100 | | |
| *10 | 4.4889 | 0.399 | 1.58364 | 30.27 |
| *11 | 1.8053 | 0.486 | | |
| *12 | 3.3103 | 0.524 | 1.53391 | 55.89 |
| *13 | 1.5428 | 0.700 | | |
| 14 | ∞ | 0.110 | 1.51633 | 64.14 |
| 15 | ∞ | 0.202 | | |
| 16 (I-Plane) | ∞ | | | |

*Aspherical Surface
A-Stop: Aperture Stop
I-Plane: Image Plane

TABLE 12

EXAMPLE 12
f = 4.410, Bf = 0.940. FNo. = 2.41, 2ω = 77.0. TL = 5.349

| Si | Ri | Di | Ndj | νdj |
|---|---|---|---|---|
| 1 (A-Stop) | ∞ | −0.169 | | |
| 2 * | 1.8583 | 0.706 | 1.53391 | 55.89 |
| 3 * | 5.9878 | 0.200 | | |
| 4 * | 8.9238 | 0.350 | 1.63351 | 23.63 |
| 5 * | 2.6606 | 0.108 | | |
| 6 * | 3.7120 | 0.434 | 1.53391 | 55.89 |
| 7 * | −37.3554 | 0.536 | | |
| 8 * | −2.5403 | 0.400 | 1.53391 | 55.89 |
| 9 * | −1.2526 | 0.100 | | |
| 10 * | 4.6576 | 0.406 | 1.58400 | 33.00 |
| 11 * | 1.8045 | 0.484 | | |
| 12 * | 3.5084 | 0.547 | 1.53391 | 55.89 |
| 13 * | 1.5917 | 0.700 | | |
| 14 | ∞ | 0.110 | 1.51633 | 64.14 |
| 15 | ∞ | 0.167 | | |
| 16 (I-Plane) | ∞ | | | |

* Aspherical Surface
A-Stop: Aperture Stop
I-Plane: Image Plane

TABLE 13

EXAMPLE 1-ASPHERICAL SURFACE DATA

| Si | K | A3 | A4 | A5 | A6 |
|---|---|---|---|---|---|
| 2 | 6.910617E−01 | −9.361153E−03 | 4.753650E−02 | −1.625166E−01 | 4.228001E−01 |
| 3 | −3.047092E+00 | −9.241917E−03 | −3.566096E−02 | 4.570996E−02 | −3.149558E−01 |
| 4 | 3.729685E+01 | 3.541191E−02 | −5.149444E−01 | 1.680908E+00 | −4.076234E+00 |
| 5 | −3.837269E+01 | 6.801134E−02 | −4.289104E−01 | 1.738556E+00 | −3.782926E+00 |
| 6 | −4.849651E+00 | −3.156056E−02 | −5.371347E−02 | −3.393668E−01 | 1.232648E+00 |
| 7 | −4.352906E+01 | −1.273280E−01 | 5.672357E−01 | −2.408249E+00 | 5.000291E+00 |
| 8 | −2.792353E+01 | 3.807506E−02 | −3.044867E−01 | 3.161824E−01 | −2.821037E−01 |
| 9 | −1.651621E+01 | 1.873207E−02 | −2.397761E−01 | −9.256965E−02 | 4.764388E−01 |
| 10 | 3.899517E+01 | 4.768780E−02 | −2.492737E−01 | 1.957615E−02 | 1.096746E−01 |
| 11 | −1.818842E+01 | 1.181462E−02 | −2.005407E−01 | −8.982901E−02 | 3.560683E−02 |
| 12 | −3.383761E+00 | 2.961170E−02 | −3.769694E−01 | 2.189476E−01 | −1.367452E−02 |
| 13 | −3.551987E+00 | 2.124714E−02 | −2.437564E−01 | 2.052106E−01 | −6.956904E−02 |

| | A7 | A8 | A9 | A10 |
|---|---|---|---|---|
| 2 | −6.203807E−01 | 4.043276E−01 | −3.926379E−03 | −8.428433E−02 |
| 3 | 5.143643E−01 | −3.615099E−01 | 4.818185E−02 | 1.040574E−02 |
| 4 | 5.718070E+00 | −4.494651E+00 | 1.663645E+00 | −1.751769E−01 |
| 5 | 4.732219E+00 | −3.360150E+00 | 1.239470E+00 | −1.928582E−01 |
| 6 | −1.757689E+00 | 1.379713E+00 | −5.157973E−01 | 4.555803E−02 |
| 7 | −5.988268E+00 | 4.288907E+00 | 1.774438E+00 | 3.591137E−01 |
| 8 | 3.116617E−01 | −2.091340E−01 | 4.360661E−02 | 1.783452E−03 |
| 9 | −3.829545E−01 | 2.118355E−01 | −9.628851E−02 | 1.964208E−02 |
| 10 | −1.128004E−02 | −2.009628E−02 | 1.432350E−03 | 1.299860E−03 |
| 11 | 2.657612E−02 | −1.146764E−02 | −2.342254E−03 | 1.067118E−03 |
| 12 | −3.155869E−02 | 1.729662E−02 | −4.205550E−03 | 3.908652E−04 |
| 13 | 1.043047E−03 | 6.995751E−03 | −2.304233E−03 | 2.590537E−04 |

TABLE 14

EXAMPLE 2-ASPHERICAL SURFACE DATA

| Si | K | A3 | A4 | A5 | A6 |
|---|---|---|---|---|---|
| 2 | 6.914623E−01 | −7.570584E−03 | 4.890039E−02 | −1.752522E−01 | 4.452969E−01 |
| 3 | 6.264315E+00 | 5.465748E−03 | −9.269472E−02 | 1.500550E−01 | −3.124034E−01 |
| 4 | 1.007891E+01 | 3.394781E−02 | −4.979112E−01 | 1.526997E+00 | −3.584034E−00 |
| 5 | −4.012633E+01 | 8.178875E−02 | −4.078194E−01 | 1.652141E+00 | −3.799419E+00 |
| 6 | −5.709908E+00 | −2.503970E−02 | −8.393308E−02 | −2.107402E−01 | 8.695287E−01 |
| 7 | −3.732810E+01 | −1.194417E−01 | 5.921169E−01 | −2.412483E+00 | 4.930572E+00 |
| 8 | 4.918172E+01 | 6.354787E−02 | −2.900617E−01 | 3.198083E−01 | −2.848727E−01 |
| 9 | −1.849797E+01 | 6.326892E−02 | −2.394112E−01 | −1.002870E−01 | 4.432884E−01 |
| 10 | 3.190189E+01 | 6.266985E−02 | −1.741147E−01 | −2.390268E−04 | 6.488639E−02 |
| 11 | −5.511843E+00 | −2.026717E−03 | −3.565721E−01 | −5.443728E−02 | 2.809180E−02 |
| 12 | −3.236122E+00 | −2.456299E−03 | −4.431752E−01 | 2.604295E−01 | −1.299963E−02 |
| 13 | −3.623014E+00 | −2.008580E−02 | −2.136047E−01 | 2.027794E−01 | −7.408671E−02 |

| | A7 | A8 | A9 | A10 |
|---|---|---|---|---|
| 2 | −6.264332E−01 | 3.919563E−01 | 6.030987E−03 | −8.588705E−02 |
| 3 | 3.604338E−01 | −2.602480E−01 | 1.151428E−01 | −5.174344E−02 |
| 4 | 4.984825E+00 | −3.878992E+00 | 1.416695E+00 | −1.463610E−01 |
| 5 | 4.921225E+00 | −3.504389E+00 | 1.241088E+00 | −1.673115E−01 |
| 6 | −1.169459E+00 | 8.394464E−01 | −2.801309E−01 | 2.062801E−02 |
| 7 | −5.873903E+00 | 4.189869E+00 | −1.742016E+00 | 3.608631E−01 |
| 8 | 3.025874E−01 | −2.063256E−01 | 4.385837E−02 | 1.792710E−03 |
| 9 | −3.311444E−01 | 1.740103E−01 | −8.109733E−02 | 1.698732E−02 |
| 10 | −2.910872E−03 | −1.006659E−02 | 3.526014E−04 | 5.456671E−04 |
| 11 | 1.430033E−02 | −6.339921E−03 | −1.061793E−03 | 4.506182E−04 |
| 12 | −4.369352E−02 | 2.224311E−02 | −5.498605E−03 | 5.630022E−04 |
| 13 | 2.473803E−03 | 7.220409E−03 | −2.403002E−03 | 2.535156E−04 |

TABLE 15

EXAMPLE 3-ASPHERICAL SURFACE DATA

| Si | K | A3 | A4 | A5 | A6 |
|---|---|---|---|---|---|
| 2 | 7.335451E−01 | −7.634394E−03 | 5.405591E−02 | −1.908111E−01 | 4.519989E−01 |
| 3 | 5.081944E+00 | 7.298613E−03 | −1.019061E−01 | 1.633106E−01 | −3.040693E−01 |
| 4 | 9.095576E+00 | 2.514085E−02 | −4.672151E−01 | 1.444506E+00 | −3.417437E+00 |

TABLE 15-continued

EXAMPLE 3-ASPHERICAL SURFACE DATA

| | | | | | |
|---|---|---|---|---|---|
| 5 | −4.384028E+01 | 8.551704E−02 | −3.682501E−01 | 1.481787E+00 | −3.453228E+00 |
| 6 | −6.880687E+00 | −1.740014E−02 | −9.331319E−02 | −1.912442E−01 | 8.111995E−01 |
| 7 | −3.413788E+01 | −1.100814E−01 | 5.957870E−01 | −2.458467E+00 | 5.013879E+00 |
| 8 | 1.258260E+01 | 7.561967E−02 | −2.585723E−01 | 3.146239E−01 | −2.976154E−01 |
| 9 | −2.110497E+01 | 5.954572E−02 | −2.413057E−01 | −8.479956E−02 | 4.355198E−01 |
| 10 | 1.396732E+01 | 7.652240E−02 | −1.534053E−01 | −9.149215E−03 | 5.088891E−02 |
| 11 | −1.093105E+01 | 7.083030E−04 | −3.225451E−02 | −5.043682E−02 | 2.427543E−02 |
| 12 | −3.412347E+00 | −1.583285E−03 | −4.120701E−01 | 2.571150E−01 | −1.278707E−02 |
| 13 | −3.623348E+00 | −6.775025E−03 | −2.245673E−01 | 2.020887E−01 | −7.270784E−02 |

| | A7 | A8 | A9 | A10 |
|---|---|---|---|---|
| 2 | −6.052347E−01 | 3.719242E−01 | −5.484551E−04 | −7.589973E−02 |
| 3 | 3.218524E−01 | −2.230721E−01 | 1.056593E−01 | −5.364770E−02 |
| 4 | 4.736856E+00 | −3.645556E+00 | 1.302722E+00 | −1.274375E−01 |
| 5 | 4.480917E+00 | −3.143704E+00 | 1.067713E+00 | −1.292708E−01 |
| 6 | −1.076110E+00 | 7.620365E−01 | 2.466390E−01 | 1.598245E−02 |
| 7 | 5.968813E−00 | 4.267550E−00 | −1.790278E+00 | 3.757057E−01 |
| 8 | 3.074672E−01 | −2.062568E−01 | 4.393613E−02 | 1.697581E−03 |
| 9 | −3.194088E−01 | 1.587376E−01 | −7.469633E−02 | 1.623517E−02 |
| 10 | −4.663484E−04 | −7.006465E−03 | 7.711688E−05 | 3.012151E−04 |
| 11 | 1.269209E−02 | −5.500461E−03 | −9.250311E−04 | 3.846894E−04 |
| 12 | −3.892668E−02 | 1.966254E−02 | −4.729278E−03 | 4.716994E−04 |
| 13 | 2.746683E−03 | 7.013881E−03 | −2.419157E−03 | 2.701164E−04 |

TABLE 16

EXAMPLE 4-ASPHERICAL SURFACE DATA

| Si | K | A3 | A4 | A5 | A6 |
|---|---|---|---|---|---|
| 2 | 7.331587E−01 | −1.108165E−02 | 7.807764E−02 | −2.729809E−01 | 5.510127E−01 |
| 3 | 5.880031E+00 | 5.360216E−03 | −8.973871E−02 | 9.960767E−02 | −1.885297E−01 |
| 4 | 1.821319E+00 | 1.035119E−02 | −3.501472E−01 | 9.646485E−01 | −2.389931E+00 |
| 5 | −3.312437E+01 | 6.329889E−02 | −2.233952E−01 | 1.001421E+00 | −2.427533E+00 |
| 6 | 1.233412E+00 | −1.066528E−02 | −5.441393E−02 | −4.083719E−02 | 2.392734E−01 |
| 7 | 4.999056E+01 | −9.562220E−02 | 5.964120E−01 | −2.185421E+00 | 4.374096E+00 |
| 8 | 1.279337E+00 | 5.903202E−02 | 3.651304E−02 | 1.857173E−01 | −3.990420E−01 |
| 9 | −8.327398E+00 | 9.205111E−02 | −9.153607E−02 | −1.359470E−01 | 3.848871E−01 |
| 10 | 2.359134E+00 | 1.203716E−01 | −1.331501E−01 | −2.094695E−02 | 2.166225E−02 |
| 11 | −2.575796E+01 | 2.135379E−02 | 1.084881E−02 | −5.957380E−02 | 2.070296E−03 |
| 12 | −3.323339E+00 | 4.069420E−03 | −4.298600E−01 | 2.540773E−01 | −2.945759E−03 |
| 13 | −5.709210E+00 | 1.040346E−02 | −2.101264E−01 | 1.452507E−01 | −3.473247E−02 |

| | A7 | A8 | A9 | A10 |
|---|---|---|---|---|
| 2 | −6.083109E−01 | 2.867888E−01 | 4.276434E−02 | −7.294547E−02 |
| 3 | 2.402367E−01 | −2.437439E−01 | 1.432260E−01 | −5.176493E−02 |
| 4 | 3.341059E+00 | −2.481882E+00 | 7.710986E−01 | −1.919855E−02 |
| 5 | 3.030765E+00 | −1.978755E+00 | 5.979893E−01 | −5.368843E−02 |
| 6 | −2.825306E−01 | 1.601016E−01 | −3.731292E−02 | 1.121611E−03 |
| 7 | −5.257212E+00 | 3.770237E+00 | −1.534264E+00 | 2.932588E−01 |
| 8 | 3.651558E−01 | −1.856871E−01 | 3.735904E−02 | −1.247793E−06 |
| 9 | −3.917143E−01 | 2.583090E−01 | −1.035826E−01 | 1.719232E−02 |
| 10 | −2.097401E−03 | 1.911541E−03 | 4.830337E−04 | −5.480260E−04 |
| 11 | 1.354762E−02 | −1.360788E−03 | −9.113309E−04 | 1.184390E−04 |
| 12 | −3.775477E−02 | 1.644838E−02 | −3.837611E−03 | 4.017754E−04 |
| 13 | −1.020431E−03 | 2.846232E−03 | −9.146502E−04 | 1.128361E−04 |

TABLE 17

EXAMPLE 5-ASPHERICAL SURFACE DATA

| Si | K | A3 | A4 | A5 | A6 |
|---|---|---|---|---|---|
| 2 | 7.968533E−01 | −1.493162E−02 | 9.743013E−02 | −3.140384E−01 | 5.905527E−01 |
| 3 | 5.195552E+00 | 1.179916E−02 | −1.115877E−01 | 1.487635E−01 | −2.246619E−01 |
| 4 | −5.184749E+00 | 1.167215E−02 | −3.239706E−01 | 8.547288E−01 | −2.035745E+00 |
| 5 | −4.163083E+01 | 5.312612E−02 | −1.937827E−01 | 8.677641E−01 | −2.138116E+00 |

TABLE 17-continued

EXAMPLE 5-ASPHERICAL SURFACE DATA

| | | | | | |
|---|---|---|---|---|---|
| 6 | 7.238625E−01 | −8.731002E−03 | −6.331866E−02 | −4.228501E−02 | 2.070388E−01 |
| 7 | 4.998416E+01 | −1.028213E−01 | 6.288485E−01 | −2.200557E+00 | 4.294787E+00 |
| 8 | 1.424318E+00 | 5.833692E−02 | 4.663334E−02 | 1.321162E−01 | −3.765964E−01 |
| 9 | −8.525822E+00 | 8.896688E−02 | −1.622853E−01 | −5.751647E−02 | 3.658320E−01 |
| 10 | 2.558786E+00 | 1.003804E−01 | −1.439497E−01 | −2.205203E−02 | 3.624070E−02 |
| 11 | −2.474112E+01 | 1.777277E−02 | −3.796602E−02 | −2.399995E−02 | 4.183594E−03 |
| 12 | −2.843733E+00 | −1.107276E−01 | −4.929364E−01 | 3.236916E−01 | −1.175190E−02 |
| 13 | −6.087386E+00 | −5.771609E−03 | −2.057330E−01 | 1.537157E−01 | −3.770407E−02 |

| | A7 | A8 | A9 | A10 |
|---|---|---|---|---|
| 2 | −6.024478E−01 | 2.486372E−01 | 6.387669E−02 | −6.936916E−02 |
| 3 | 2.261243E−01 | −2.284736E−01 | 1.638492E−01 | −7.378581E−02 |
| 4 | 2.760819E+00 | −1.979039E+00 | 5.789816E−01 | −1.896735E−02 |
| 5 | 2.700828E+00 | −1.744236E+00 | 4.950198E−01 | −3.234074E−02 |
| 6 | −2.187840E−01 | 1.178926E−01 | −2.715538E−02 | 1.000263E−03 |
| 7 | −5.118600E+00 | 3.690096E+00 | −1.517670E+00 | 2.898127E−01 |
| 8 | 3.861653E−01 | −1.961896E−01 | 3.510284E−02 | 1.071886E−03 |
| 9 | −4.291770E−01 | 2.781225E−01 | −9.782456E−02 | 1.368632E−02 |
| 10 | −5.537853E−03 | −4.325643E−03 | 1.280814E−03 | 2.196046E−04 |
| 11 | 3.493481E−03 | −4.242560E−04 | −4.296418E−05 | 3.837868E−05 |
| 12 | −5.296947E−02 | 2.454097E−02 | −5.557692E−03 | 5.546509E−04 |
| 13 | −1.230394E−03 | 3.084195E−03 | −1.027911E−03 | 1.355488E−04 |

TABLE 18

EXAMPLE 6-ASPHERICAL SURFACE DATA

| Si | K | A3 | A4 | A5 | A6 |
|---|---|---|---|---|---|
| 1 | 8.155984E−01 | −2.344498E−02 | 1.414652E−01 | −3.596819E−01 | 4.871620E−01 |
| 2 | 1.318228E+01 | 4.860545E−03 | −7.153919E−02 | 6.729157E−02 | −8.836940E−02 |
| 4 | 1.708024E+01 | 5.459085E−03 | −3.134356E−01 | 7.173181E−01 | −1.606852E+00 |
| 5 | −4.333206E+01 | 6.414999E−02 | −2.049572E−01 | 1.018347E+00 | −2.773655E+00 |
| 6 | 1.080929E+00 | −1.542798E−02 | −1.190987E−02 | −8.706304E−02 | 2.149742E−01 |
| 7 | 3.652103E+01 | −1.259166E−01 | 7.548204E−01 | −2.481675E+00 | 4.832164E+00 |
| 8 | 1.557954E+00 | 5.005284E−02 | 2.736082E−02 | 1.263465E−01 | −3.633019E−01 |
| 9 | −1.629243E+01 | 4.435060E−02 | −1.446018E−01 | −2.806788E−02 | 2.897406E−01 |
| 10 | 8.527035E−01 | 1.025898E−01 | −1.555234E−01 | −1.313562E−02 | 2.887909E−02 |
| 11 | −3.629654E+01 | 4.793702E−02 | −5.488115E−02 | −3.536236E−02 | 8.909440E−03 |
| 12 | −1.422891E+00 | 1.301092E−01 | −4.198349E−01 | 2.268136E−01 | 6.752492E−03 |
| 13 | −5.917094E+00 | 2.959216E−02 | −2.364959E−01 | 1.761345E−01 | −4.813890E−02 |

| | A7 | A8 | A9 | A10 |
|---|---|---|---|---|
| 2 | −2.914617E−01 | 5.397157E−02 | −6.637829E−03 | 1.668952E−02 |
| 3 | 1.061221E−01 | −8.312113E−02 | 5.461599E−02 | −3.016575E−02 |
| 4 | 2.130324E+00 | 1.414834E+00 | 3.822806E−01 | −2.854977E−02 |
| 5 | 3.700795E+00 | −2.439327E+00 | 7.020188E−01 | −4.939819E−02 |
| 6 | −2.765458E−01 | 1.933012E−01 | −4.551044E−02 | −1.420833E−03 |
| 7 | −5.822136E+00 | 4.298438E+00 | −1.840486E+00 | 3.656630E−01 |
| 8 | 3.870053E−01 | −1.988205E−01 | 3.447623E−02 | 1.486418E−03 |
| 9 | −3.613844E−01 | 2.346272E−01 | −7.632969E−02 | 9.138350E−03 |
| 10 | −6.590557E−03 | −1.116584E−03 | 1.268437E−03 | −9.956588E−05 |
| 11 | 5.731352E−03 | −9.421590E−04 | −2.004892E−04 | 5.506109E−05 |
| 12 | −3.142326E−02 | 1.090226E−02 | −2.334463E−03 | 2.535597E−04 |
| 13 | −9.141508E−04 | 4.519784E−03 | −1.441645E−03 | 1.670451E−04 |

TABLE 19

EXAMPLE 7-ASPHERICAL SURFACE DATA

| Si | K | A3 | A4 | A5 | A6 |
|---|---|---|---|---|---|
| 2 | 8.069642E−01 | −2.152220E−02 | 1.129006E−01 | −2.587966E−01 | 3.415639E−01 |
| 3 | 1.283230E+01 | 2.021445E−03 | −6.635221E−02 | 7.194713E−02 | −1.063805E−01 |
| 4 | 1.719284E+01 | 1.158388E−02 | −3.138786E−01 | 7.139515E−01 | −1.600715E+00 |
| 5 | −3.961409E+01 | 6.546649E−02 | −1.772491E−01 | 9.468038E−01 | −2.563550E+00 |
| 6 | 1.089288E+00 | −6.637701E−03 | −1.069055E−02 | −7.805679E−02 | 1.979668E−01 |

TABLE 19-continued

EXAMPLE 7-ASPHERICAL SURFACE DATA

| | | | | | |
|---|---|---|---|---|---|
| 7 | 3.692794E+01 | −1.117274E−01 | 7.223332E−01 | −2.344307E+00 | 4.477967E+00 |
| 8 | 1.559081E+00 | 4.362452E−02 | 2.176404E−02 | 1.249439E−01 | −3.624065E−01 |
| 9 | −1.692527E+01 | 3.767878E−02 | −1.729306E−01 | −7.378213E−03 | 3.126428E−01 |
| 10 | 8.639981E−01 | 3.614714E−02 | −1.403008E−01 | 1.687145E−02 | 2.926884E−02 |
| 11 | −4.195532E+01 | −1.095485E−02 | −3.726687E−02 | −1.222700E−02 | 3.224105E−03 |
| 12 | −1.685485E+00 | 8.474411E−03 | −3.802511E−01 | 2.097975E−01 | 1.021217E−03 |
| 13 | −5.579507E+00 | 4.597701E−02 | −2.292901E−01 | 1.730937E−01 | −4.972236E−02 |

| | A7 | A8 | A9 | A10 |
|---|---|---|---|---|
| 2 | −2.225100E−01 | 6.055529E−02 | 4.957782E−04 | 1.319846E−03 |
| 3 | 1.305516E−01 | −9.381796E−02 | 5.644889E−02 | −3.424089E−02 |
| 4 | 2.118413E+00 | −1.405571E+00 | 3.807638E−01 | −3.019831E−02 |
| 5 | 3.347628E+00 | −2.167692E+00 | 6.166190E−01 | −4.403511E−02 |
| 6 | −2.581639E−01 | 1.752749E−01 | −3.985024E−02 | −1.268772E−03 |
| 7 | −5.307426E+00 | 3.874489E+00 | −1.645073E+00 | 3.220765E−01 |
| 8 | 3.887047E−01 | −1.985989E−01 | 3.441174E−02 | 1.367139E−03 |
| 9 | −4.012355E−01 | 2.577081E−01 | −8.296832E−02 | 1.004771E−02 |
| 10 | −1.490104E−02 | −1.821825E−03 | 2.114654E−03 | −2.657447E−05 |
| 11 | 2.185727E−03 | 1.375439E−04 | −4.334456E−05 | −1.949607E−05 |
| 12 | −2.830821E−02 | 1.058191E−02 | −2.181499E−03 | 2.130987E−04 |
| 13 | −1.068775E−00 | 4.728265E−03 | −1.355649E−03 | 1.383361E−04 |

TABLE 20

EXAMPLE 8-ASPHERICAL SURFACE DATA

| Si | K | A3 | A4 | A5 | A6 |
|---|---|---|---|---|---|
| 2 | 8.166048E−01 | −1.535983E−02 | 1.062307E−01 | −2.735594E−01 | 3.710392E−01 |
| 3 | 1.338125E+01 | −2.954144E−03 | −5.939095E−02 | 7.662023E−02 | −1.255806E−01 |
| 4 | 1.474225E+01 | 1.908019E−02 | −3.226306E−01 | 7.046475E−01 | −1.583125E+00 |
| 5 | −4.017926E+01 | 6.444093E−02 | −1.769770E−01 | 9.729473E−01 | −2.649801E+00 |
| 6 | 1.103277E+00 | −6.762854E−03 | −1.086774E−02 | −7.762822E−02 | 1.976697E−01 |
| 7 | 3.424725E+01 | −1.124859E−01 | 7.187649E−01 | −2.357139E+00 | 4.518286E−00 |
| 8 | 1.546489E+00 | 3.938132E−02 | 2.206815E−02 | 1.262596E−01 | −3.621144E−01 |
| 9 | −1.633920E+01 | 4.116578E−02 | −1.717990E−01 | −8.707967E−03 | 3.118141E−01 |
| 10 | 6.546453E−01 | 3.838282E−02 | −1.325073E−01 | 1.473555E−02 | 2.562314E−02 |
| 11 | −4.540462E+01 | −8.309463E−04 | −3.636417E−02 | −1.524374E−02 | 2.988287E−03 |
| 12 | −1.633643E+00 | 2.298209E−03 | −3.770349E−01 | 2.113827E−01 | 4.600040E−04 |
| 13 | −5.542275E+00 | 5.429090E−02 | −2.517593E−01 | 1.913115E−01 | −5.588356E−02 |

| | A7 | A8 | A9 | A10 |
|---|---|---|---|---|
| 2 | −2.228176E−01 | 4.345251E−02 | −2.299020E−03 | 7.523693E−03 |
| 3 | 1.339711E−01 | −8.297518E−02 | 5.792007E−02 | −3.927949E−02 |
| 4 | 2.119043E+00 | −1.413805E+00 | 3.795057E−01 | −2.767800E−02 |
| 5 | 3.466974E+00 | −2.251533E+00 | 6.458755E−01 | −4.795414E−02 |
| 6 | −2.576459E−01 | 1.747149E−01 | −3.964381E−02 | −1.287409E−03 |
| 7 | −5.352693E+00 | 3.904846E+00 | −1.660437E+00 | 3.264048E−01 |
| 8 | 3.882727E−01 | −1.984950E−01 | 3.430175E−02 | 1.410283E−03 |
| 9 | −4.017454E−01 | 2.591826E−01 | −8.329985E−02 | 9.987172E−03 |
| 10 | −1.410064E−02 | −1.222629E−03 | 2.003821E−03 | −6.177371E−05 |
| 11 | 2.618097E−03 | 1.766902E−04 | −6.381131E−05 | −2.179057E−05 |
| 12 | −2.846389E−02 | 1.062647E−02 | −2.175739E−03 | 2.116734E−04 |
| 13 | −1.108359E−03 | 5.527084E−03 | −1.638062E−03 | 1.718173E−04 |

TABLE 21

EXAMPLE 9-ASPHERICAL SURFACE DATA

| Si | K | A3 | A4 | A5 | A6 |
|---|---|---|---|---|---|
| 2 | 8.117653E−01 | −2.122617E−02 | 1.132839E−01 | −2.712799E−01 | 3.717316E−01 |
| 3 | 1.336958E+01 | 4.915909E−03 | −7.805899E−02 | 7.437461E−02 | −1.078484E−01 |
| 4 | 1.811394E+01 | 1.002698E−02 | −3.290371E−01 | 7.354679E−01 | −1.649694E+00 |
| 5 | −3.587897E+01 | 5.331399E−02 | −1.841539E−01 | 8.497074E−01 | −2.211147E+00 |
| 6 | 1.084322E+00 | −7.978715E−03 | 1.937929E−02 | 7.921119E−02 | 2.072163E−01 |
| 7 | 3.550085E+01 | −1.141285E−01 | 7.271666E−01 | −2.365647E+00 | 4.539722E+00 |

TABLE 21-continued

EXAMPLE 9-ASPHERICAL SURFACE DATA

| | | | | | |
|---|---|---|---|---|---|
| 8 | 1.554213E+00 | 4.793484E−02 | 2.737612E−02 | 1.197765E−01 | −3.568576E−01 |
| 9 | −1.647713E+01 | 4.035237E−02 | −1.769358E−01 | −7.513798E−03 | 3.249628E−01 |
| 10 | 9.644562E−01 | 4.866765E−02 | 1.442325E−01 | 8.212144E−03 | 2.732561E−02 |
| 11 | −4.074049E+01 | 1.393292E−03 | −4.279445E−02 | −1.645019E−02 | 3.271050E−03 |
| 12 | −1.517614E+00 | 7.373368E−03 | −3.864744E−01 | 2.161079E−01 | 6.718675E−05 |
| 13 | −5.580760E+00 | 3.772282E−02 | −2.133980E−01 | 1.640625E−01 | −4.784823E−02 |

| | A7 | A8 | A9 | A10 |
|---|---|---|---|---|
| 2 | −2.433746E−01 | 5.988763E−02 | 1.490164E−03 | 3.044078E−03 |
| 3 | 1.437895E−01 | −1.118128E−01 | 6.596747E−02 | −3.850851E−02 |
| 4 | 2.212239E+00 | −1.482197E+00 | 4.002408E−01 | −2.973777E−02 |
| 5 | 2.863539E+00 | −1.831252E+00 | 5.042983E−01 | −3.136728E−02 |
| 6 | −2.603940E−01 | 1.745126E−01 | −4.033080E−02 | −9.435400E−04 |
| 7 | −5.405515E+00 | 3.954786E+00 | −1.678583E+00 | 3.283958E−01 |
| 8 | 3.791276E−01 | −1.923073E−01 | 3.320309E−02 | 1.303451E−03 |
| 9 | −4.321845E−01 | 2.842150E−01 | −9.134120E−02 | 1.074001E−02 |
| 10 | −1.332166E−02 | −7.455566E−04 | 2.089979E−03 | −1.504830E−04 |
| 11 | 2.995941E−03 | 3.114287E−04 | −8.759010E−05 | −3.464833E−05 |
| 12 | −2.947375E−02 | 1.135456E−02 | −2.384362E−03 | 2.330948E−04 |
| 13 | −8.102066E−04 | 4.432626E−03 | −1.242484E−03 | 1.216624E−04 |

TABLE 22

EXAMPLE 10-ASPHERICAL SURFACE DATA

| Si | K | A3 | A4 | A5 | A6 |
|---|---|---|---|---|---|
| 2 | 9.247754E−01 | −8.920955E−03 | 7.296801E−02 | −2.273469E−01 | 3.700453E−01 |
| 3 | 2.762972E+00 | 3.412107E−03 | −5.177031E−02 | 8.598368E−02 | −9.584594E−02 |
| 4 | −1.432846E−02 | 2.684205E−03 | −2.664518E−01 | 6.219093E−01 | −1.367584E+00 |
| 5 | −3.798248E+01 | 5.959916E−02 | 1.585191E−01 | 8.400639E−01 | −2.290890E+00 |
| 6 | 7.686735E−01 | 1.286629E−02 | −1.830082E−02 | −7.671867E−02 | 2.221363E−01 |
| 7 | 4.994640E+01 | −1.026824E−01 | 6.328778E−01 | −2.106137E+00 | 4.067203E+00 |
| 8 | 1.404450E+00 | 4.418677E−02 | 5.087611E−02 | 1.247887E−01 | −3.347616E−01 |
| 9 | −8.664207E+00 | 6.798216E−02 | 1.386325E−01 | −3.260334E−02 | 2.704366E−01 |
| 10 | 2.358563E+00 | 9.579378E−02 | 1.495164E−01 | −1.771214E−02 | 3.940317E−02 |
| 11 | −2.322398E+01 | 3.028268E−02 | −5.574584E−02 | −1.992520E−02 | 1.177096E−02 |
| 12 | −4.218749E+00 | −9.933737E−04 | −3.945914E−01 | 2.393767E−01 | −4.846404E−03 |
| 13 | −6.151125E+00 | −6.562181E−03 | −1.669666E−01 | 1.265144E−01 | −3.331166E−02 |

| | A7 | A8 | A9 | A10 |
|---|---|---|---|---|
| 2 | −2.760813E−01 | 6.430044E−02 | 2.785368E−02 | −8.509762E−03 |
| 3 | 4.638958E−02 | −1.042563E−02 | 2.894852E−02 | −2.183684E−02 |
| 4 | 1.721797E+00 | −1.108215E+00 | 3.057364E−01 | −2.366600E−02 |
| 5 | 2.910055E+00 | −1.823684E+00 | 5.163313E−01 | −4.186296E−02 |
| 6 | −3.377910E−01 | 2.461535E−01 | 5.434074E−02 | −4.312272E−03 |
| 7 | −4.815146E+00 | 3.442657E+00 | 1.412028E+00 | 2.684741E−01 |
| 8 | 3.293725E−01 | −1.652157E−01 | 2.923248E−02 | 8.946940E−04 |
| 9 | −2.993492E−01 | 1.802371E−01 | −5.980802E−02 | 8.065860E−03 |
| 10 | −3.365746E−03 | −5.095225E−03 | 7.092076E−04 | 2.753381E−04 |
| 11 | 2.034067E−03 | −1.380909E−03 | 1.251824E−05 | 7.493862E−05 |
| 12 | −3.496066E−02 | 1.434501E−02 | −2.963344E−03 | 2.794533E−04 |
| 13 | −6.637074E−05 | 2.483118E−03 | −8.235432E−04 | 1.000115E−04 |

TABLE 23

EXAMPLE 11-ASPILERICAL SURFACE DATA

| Si | K | A3 | A4 | A5 | A6 |
|---|---|---|---|---|---|
| 2 | 7.976049E−01 | −1.572023E−02 | 9.906583E−02 | −3.129098E−01 | 5.871042E−01 |
| 3 | 5.195542E+00 | 1.028084E−02 | −1.111546E−01 | 1.495531E−01 | −2.289193E−01 |
| 4 | −5.183823E+00 | 9.852331E−03 | −3.283712E−01 | 8.492048E−01 | −2.018739E+00 |
| 5 | −4.163081E+01 | 5.585561E−02 | −1.994314E−01 | 8.687353E−01 | −2.143497E+00 |
| 6 | 7.238319E−01 | −6.398341E−03 | −6.258406E−02 | −4.425123E−02 | 2.047416E−01 |
| 7 | 4.998416E+01 | −1.030507E−01 | 6.338504E−01 | −2.199784E+00 | 4.289491E+00 |
| 8 | 1.424552E+00 | 6.070046E−02 | 4.544493E−02 | 1.310677E−01 | −3.749595E−01 |
| 9 | −8.525983E+00 | 8.832511E−02 | −1.658322E−01 | −5.566188E−02 | 3.718993E−01 |
| 10 | 2.558836E+00 | 1.027380E−01 | 1.433318E−01 | −2.347178E−02 | 3.652476E−02 |
| 11 | −2.474083E+01 | 1.723345E−02 | −3.701403E−02 | −2.373670E−02 | 3.583120E−03 |
| 12 | −2.843707E+00 | −1.277276E−02 | −4.715949E−01 | 3.088031E−01 | −1.176960E−02 |

TABLE 23-continued

EXAMPLE 11-ASPILERICAL SURFACE DATA

| | | | | | |
|---|---|---|---|---|---|
| 13 | −6.087257E+00 | −1.368832E−03 | −2.019413E−01 | 1.502191E−01 | −3.717252E−02 |

| | A7 | A8 | A9 | A10 |
|---|---|---|---|---|
| 2 | −6.026986E−01 | 2.528937E−01 | 6.357807E−02 | −7.106161E−02 |
| 3 | 2.323165E−01 | −2.264174E−01 | 1.636130E−01 | −7.601008E−02 |
| 4 | 2.745066E+00 | −1.962644E+00 | 5.691353E−01 | 1.748919E−02 |
| 5 | 2.721734E+00 | 1.762243E+00 | 4.986989E−01 | −3.168811E−02 |
| 6 | −2.157224E−01 | 1.168898E−01 | −2.701379E−02 | 9.678208E−04 |
| 7 | −5.120361E+00 | 3.695711E+00 | −1.519150E+00 | 2.895140E−01 |
| 8 | 3.853792E−01 | −1.958360E−01 | 3.487970E−02 | 1.126869E−03 |
| 9 | −4.342644E−01 | 2.798345E−01 | −9.883140E−02 | 1.402769E−02 |
| 10 | −4.979817E−03 | −4.430887E−03 | 1.206191E−03 | 2.289446E−04 |
| 11 | 3.406486E−03 | −3.294225E−04 | −2.939080E−05 | 3.419842E−05 |
| 12 | −4.943772E−02 | 2.268934E−02 | −5.069679E−03 | 4.995794E−04 |
| 13 | −1.132209E−03 | 3.021427E−03 | −9.988708E−04 | 1.304203E−04 |

TABLE 24

EXAMPLE 12-ASPHERICAL SURFACE DATA

| Si | K | A3 | A4 | A5 | A6 |
|---|---|---|---|---|---|
| 1 | 7.967866E−01 | −1.571706E−02 | 9.844661E−02 | −3.101566E−01 | 5.818111E−01 |
| 2 | 5.220480E+00 | 7.183071E−03 | −1.075657E−01 | 1.422923E−01 | −2.335190E−01 |
| 4 | −4.885077E+00 | 9.625817E−03 | −3.383512E−01 | 8.443855E−01 | −1.988163E+00 |
| 5 | −4.154711E+01 | 5.802549E−02 | −2.202705E−01 | 9.134379E−01 | −2.252182E+00 |
| 6 | 7.271775E−01 | −7.620488E−03 | −6.415864E−02 | −4.540525E−02 | 2.021323E−01 |
| 7 | 4.616336E+01 | −1.052898E−01 | 6.494053E−01 | −2.247350E+00 | 4.400041E+00 |
| 8 | 1.425452E+00 | 6.169665E−02 | 4.513647E−02 | 1.308307E−01 | −3.756297E−01 |
| 9 | −8.530534E+00 | 9.753580E−02 | −1.616762E−01 | −6.041429E−02 | 3.555957E−01 |
| 10 | 2.562939E+00 | 1.155765E−01 | −1.408155E−01 | −2.957654E−02 | 3.644446E−02 |
| 11 | −2.491104E+01 | 2.184185E−02 | −3.663258E−02 | −2.434796E−02 | 2.633643E−03 |
| 12 | −2.824435E+00 | −1.114204E−02 | −4.581008E−01 | 2.952135E−01 | −1.037502E−02 |
| 13 | −6.124266E+00 | 1.106712E−03 | −2.004680E−01 | 1.473625E−01 | −3.598176E−02 |

| | A7 | A8 | A9 | A10 |
|---|---|---|---|---|
| 2 | −6.054684E−01 | 2.635932E−01 | 6.129417E−02 | −7.465026E−02 |
| 3 | 2.521767E−01 | −2.303578E−01 | 1.548957E−01 | −7.436433E−02 |
| 4 | 2.741791E+00 | −1.970659E+00 | 5.644147E−01 | −1.537364E−02 |
| 5 | 2.909806E+00 | −1.914669E+00 | 5.439082E−01 | −3.219093E−02 |
| 6 | −2.099337E−01 | 1.138298E−01 | −2.648959E−02 | 9.441085E−04 |
| 7 | −5.274317E+00 | 3.825586E+00 | −1.579755E+00 | 3.018611E−01 |
| 8 | 3.850000E−01 | −1.956757E−01 | 3.490179E−02 | 1.127286E−03 |
| 9 | −4.104351E−01 | 2.633196E−01 | −9.247858E−02 | 1.304336E−02 |
| 10 | −3.105506E−03 | −4.542979E−03 | 9.796919E−04 | 2.371880E−04 |
| 11 | 3.275821E−03 | −1.654192E−04 | −5.926349E−06 | 2.660163E−05 |
| 12 | −4.640497E−02 | 2.101962E−02 | −4.663501E−03 | 4.561187E−04 |
| 13 | −1.026016E−03 | 2.891705E−03 | −9.774143E−04 | 1.285627E−04 |

TABLE 25

VALUES WITH RESPECT TO CONDITIONAL EXPRESSIONS(C-E)

| C-E No. | C-E | Example 1 | Example 2 | Example 3 | Example 4 | Example 5 | Example 6 |
|---|---|---|---|---|---|---|---|
| 1 | vd5 | 55.89 | 23.63 | 23.63 | 23.63 | 23.63 | 23.63 |
| 2 | vd2 | 23.63 | 23.63 | 23.63 | 23.63 | 23.63 | 23.63 |
| 3 | f3/f1 | 4.078 | 2.364 | 2.396 | 1.465 | 1.351 | 1.090 |
| 4 | f6/f2 | 0.624 | 0.698 | 0.724 | 0.804 | 0.922 | 0.940 |

| C-E No. | C-E | Example 7 | Example 8 | Example 9 | Example 10 | Example 11 | Example 12 |
|---|---|---|---|---|---|---|---|
| 1 | vd5 | 23.63 | 23.63 | 23.63 | 23.63 | 30.27 | 33.00 |
| 2 | vd2 | 23.63 | 23.63 | 23.63 | 23.63 | 23.63 | 23.63 |
| 3 | f3/f1 | 1.080 | 1.163 | 1.060 | 1.033 | 1.341 | 1.333 |
| 4 | f6/f2 | 0.951 | 1.006 | 0.924 | 0.928 | 0.960 | 0.991 |

What is claimed is:

1. An imaging lens substantially consisting of six lenses, composed of:
   a first lens having a positive refractive power and a convex surface on the object side;
   a second lens having a negative refractive power and a concave surface on the image side;
   a third lens having a positive refractive power and a convex surface on the object side;
   a fourth lens having a positive refractive power;
   a fifth lens having a negative refractive power and a concave surface on the image side; and
   a sixth lens having a negative refractive power with the image side surface having an aspherical shape which is concave on the image side near the optical axis and convex in a peripheral region, arranged in this order from the object side.

2. The imaging lens of claim 1, wherein the third lens is a bi-convex lens.

3. The imaging lens of claim 1, wherein the image side surface of the fifth lens has an aspherical shape which is concave on the image side near the optical axis and convex in a peripheral region.

4. The imaging lens of claim 1, further satisfying a conditional expression given below:

$$vd2<35 \qquad (2),$$

where vd2 is an Abbe number of the second lens with respect to the d-line.

5. An imaging apparatus provided with the imaging lens of claim 1.

6. The imaging lens of claim 1, wherein an aperture stop is disposed on the object side of the object side surface of the second lens.

7. The imaging lens of claim 6, wherein the aperture stop is disposed on the object side of the object side surface of the first lens.

8. The imaging lens of claim 1, wherein the lens satisfies a conditional expression given below:

$$vd5<35 \qquad (1),$$

where, vd5 is an Abbe number of the fifth lens with respect to the d-line.

9. The imaging lens of claim 8, further satisfying a conditional expression given below:

$$vd5<33 \qquad (1\text{-}1).$$

10. The imaging lens of claim 9, further satisfying a conditional expression given below:

$$vd5<31 \qquad (1\text{-}2).$$

11. The imaging lens of claim 1, further satisfying a conditional expression given below:

$$0.4<f6/f2<1.3 \qquad (4),$$

where:
f2 is a focal length of the second lens; and
f6 is a focal length of the sixth lens.

12. The imaging lens of claim 11, further satisfying a conditional expression given below:

$$0.5<f6/f2<1.2 \qquad (4\text{-}1).$$

13. The imaging lens of claim 12, further satisfying a conditional expression given below:

$$0.55<f6/f2<1.1 \qquad (4\text{-}2).$$

14. The imaging lens of claim 1, further satisfying a conditional expression given below:

$$0.9<f3/f1 \qquad (3),$$

where:
f1 is a focal length of the first lens; and
f3 is a focal length of the third lens.

15. The imaging lens of claim 14, further satisfying a conditional expression given below:

$$1.0<f3/f1<10 \qquad (3\text{-}1).$$

16. The imaging lens of claim 15, further satisfying a conditional expression given below:

$$1.0<f3/f1<8 \qquad (3\text{-}2).$$

17. The imaging lens of claim 16, further satisfying a conditional expression given below:

$$1.0<f3/f1<5 \qquad (3\text{-}3).$$

* * * * *